United States Patent
Sowa et al.

(10) Patent No.: US 7,929,008 B2
(45) Date of Patent: Apr. 19, 2011

(54) LINE HEAD AND AN IMAGE FORMING APPARATUS

(75) Inventors: Takeshi Sowa, Matsumoto (JP); Nozomu Inoue, Matsumoto (JP); Yujiro Nomura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/353,824

(22) Filed: Jan. 14, 2009

(65) Prior Publication Data

US 2009/0185287 A1 Jul. 23, 2009

(30) Foreign Application Priority Data

Jan. 21, 2008 (JP) ................... 2008-010606
Nov. 18, 2008 (JP) ................... 2008-294708

(51) Int. Cl.
*B41J 15/14* (2006.01)
*B41J 27/00* (2006.01)
(52) U.S. Cl. .................. 347/244; 347/258
(58) Field of Classification Search ............ 347/238, 347/241, 244, 256, 258; 359/628
See application file for complete search history.

(56) References Cited

U.S. PATENT DOCUMENTS

| | | | | | |
|---|---|---|---|---|---|
| 5,345,336 | A | * | 9/1994 | Aoyama et al. | 359/628 |
| 6,069,741 | A | * | 5/2000 | Osawa | 359/621 |
| 6,653,705 | B2 | * | 11/2003 | Ushijima et al. | 257/432 |
| 6,816,181 | B2 | * | 11/2004 | Ohkubo | 347/238 |
| 6,844,888 | B2 | * | 1/2005 | Nakamura | 347/138 |
| 2008/0080057 | A1 | * | 4/2008 | Yamamura | 359/622 |
| 2009/0244713 | A1 | * | 10/2009 | Kodera et al. | 359/619 |

FOREIGN PATENT DOCUMENTS

JP 2801838 9/1998
JP 2005-276849 10/2005

* cited by examiner

*Primary Examiner* — Hai C Pham
(74) *Attorney, Agent, or Firm* — DLA Piper LLP (US)

(57) ABSTRACT

A line head includes: a first lens formed from a resin and on a glass substrate; and a light emitting element substrate that has light emitting elements arranged in a first direction, wherein a cross section of the first lens taken in the first direction and including an optical axis of the first lens has a configuration wherein a curvature of the first lens at the optical axis has a larger absolute value than a curvature of an outer peripheral portion of the first lens.

16 Claims, 28 Drawing Sheets

F I G. 2
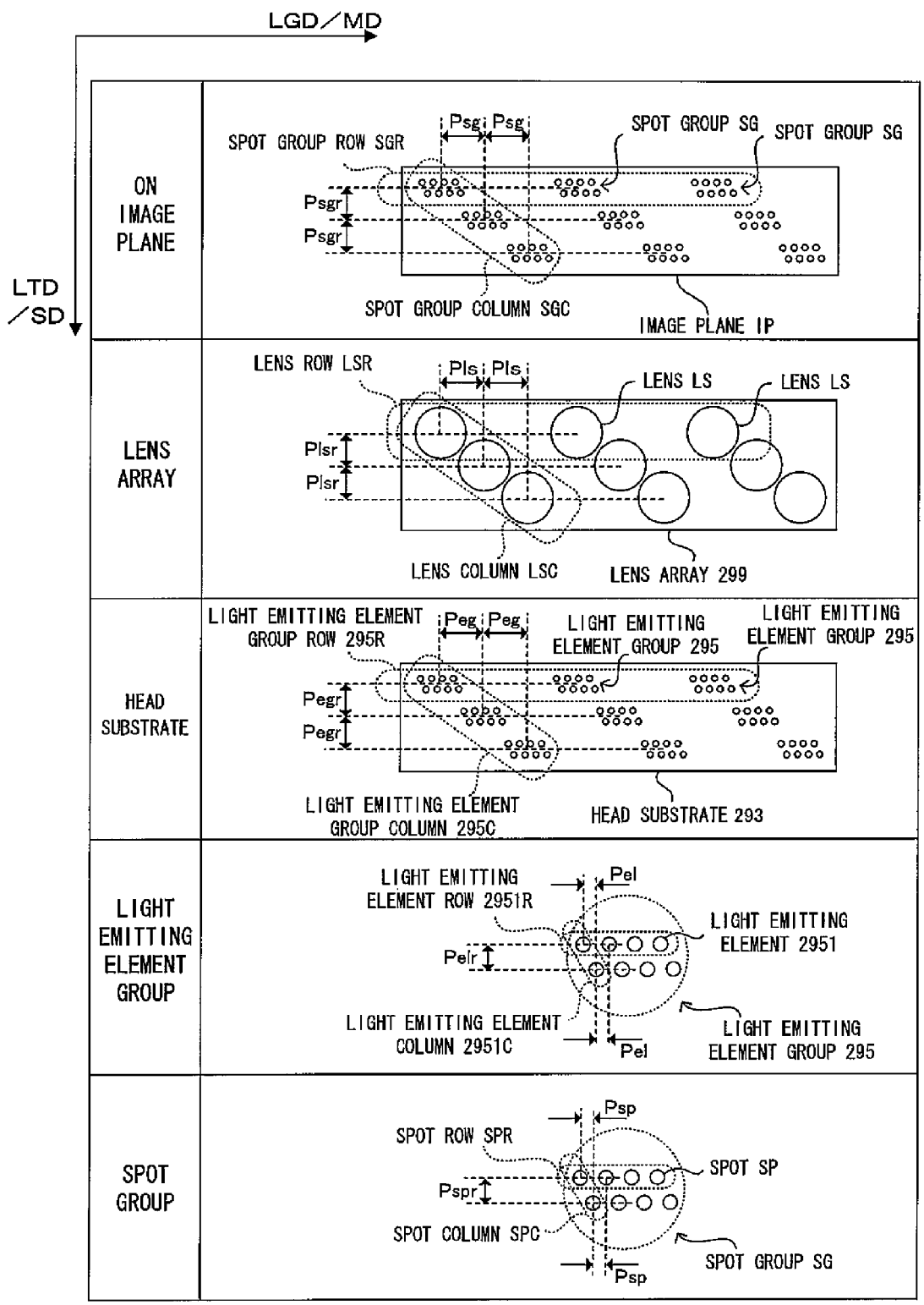

F I G. 7
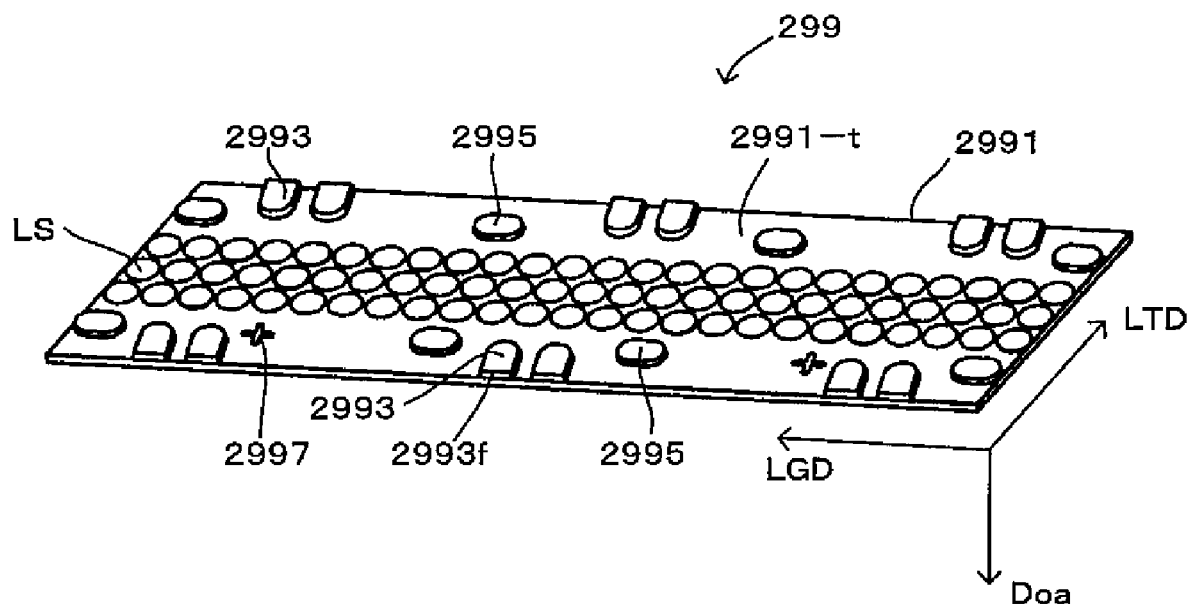

F I G. 1 1
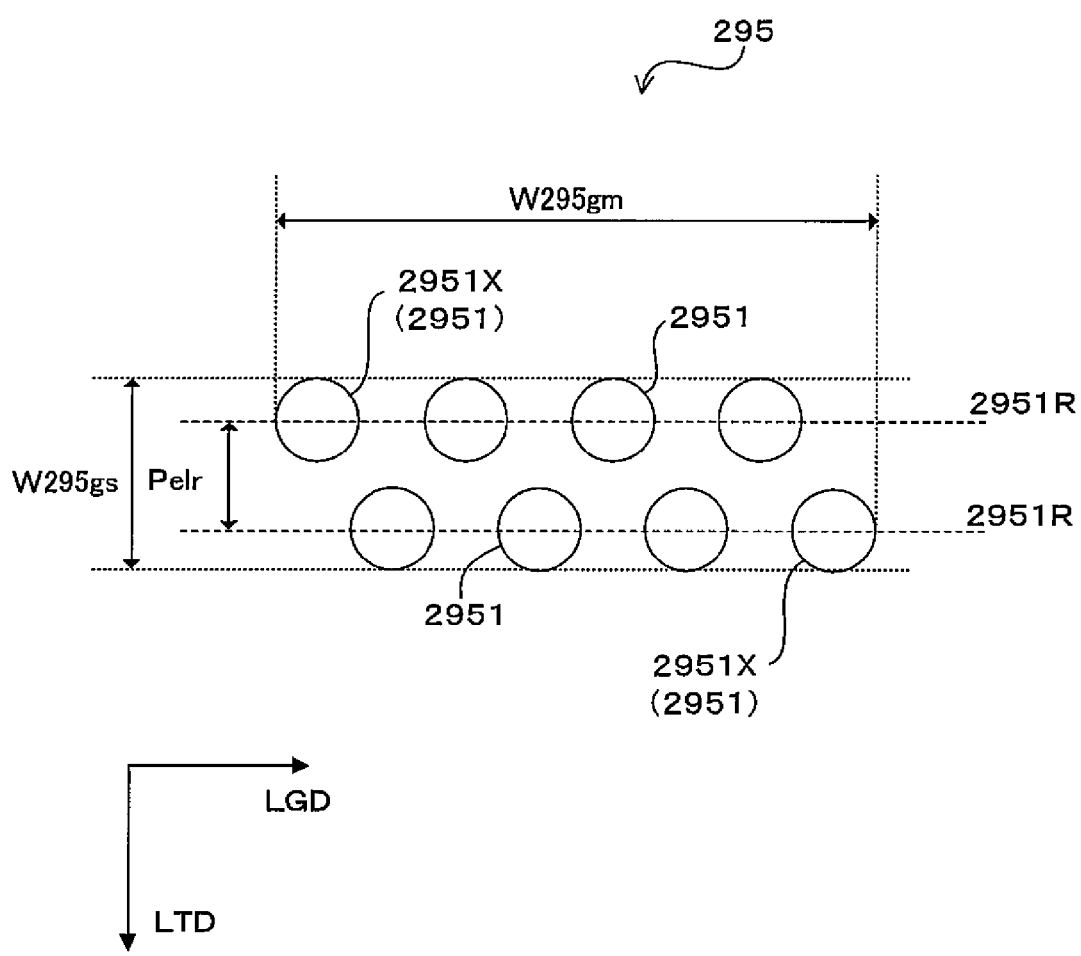

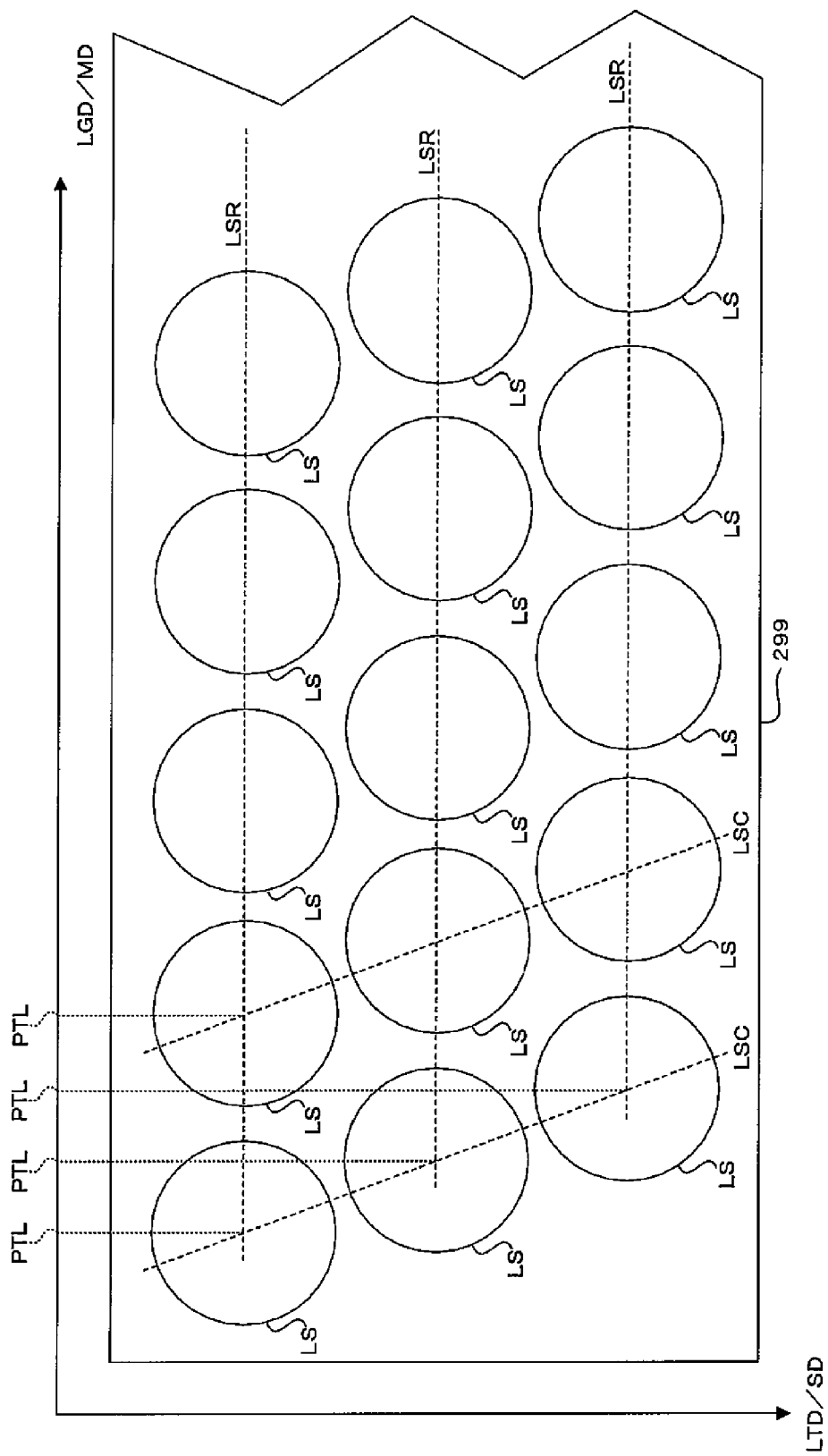

ANGLE OF TANGENT AT OUTER PERIPHERAL PORTION : $\beta 1$

INCLINATION OF TANGENT AT OUTER PERIPHERAL PORTION : : $\tan(\beta 1)$
$0° < \beta 1 < 90°$

FIG. 25

UNIT: mm

| SURFACE NUMBER | rm (CENTER CURVATURE RADIUS AT CROSS SECTION IN MAIN SCANNING DIRECTION) | d | nd | K,A,B,C,D,E,F,G,H,I(ASPHERIC COEFFICIENT) c(CURVATURE ON OPTICAL AXIS) |
|---|---|---|---|---|
| S1 (OBJECT PLANE) | rm1= ∞ | d1= 0.55 | nd1= 1.499857 | |
| S2 (EMERGENT SURFACE OF GLASS BASE MATERIAL) | rm2= ∞ | d2= 4.2055 | | |
| S3 (APERTURE) | rm3= ∞ | d3= 0.03 | | |
| S4 (x-y POLYNOMIAL SURFACE) | | d4= 0.26 | nd4= 1.525643 | c4=1/1.623812<br>K4=-1.035799<br>A4=0.0291560<br>B4=0.0295538<br>C4=0.000532069<br>D4=0.00466253<br>E4=0.00321193<br>F4=0.000148590<br>G4=-0.00150163<br>H4=0.00179733<br>I4=-0.00276144 |
| S5 (GLASS BASE MATERIAL) | rm5= ∞ | d5= 0.9 | nd5= 1.536988 | |
| S6 | rm6= ∞ | d6= 1.3926 | | |
| S7 (x-y POLYNOMIAL SURFACE) | | d7= 0.29 | nd7= 1.525643 | c7=1/1.921041<br>K7=-7.158948<br>A7=0.132693<br>B7=0.127483<br>C7=0.087695<br>D7=0.153759<br>E7=0.069963<br>F7=-0.076514<br>G7=-0.22614<br>H7=-0.236914<br>I7=-0.029641 |
| S8 (GLASS BASE MATERIAL) | rm8= ∞ | d8= 0.90 | nd8= 1.536988 | |
| S9 | rm9= ∞ | d9= 0.879 | | |
| S10 (IMAGE PLANE) | rm10= ∞ | | | |

NON-ROTATIONALLY-SYMMETRICAL ASPHERIC SURFACE (x-y POLYNOMIAL SURFACE) DEFINITIONAL EQUATION···

$$\frac{cr^2}{1+\sqrt{1-(1+K)c^2r^2}} + Ax^2 + By^2 + Cx^4 + Dx^2y^2 + Ey^4 + Fx^6 + Gx^4y^2 + Hx^2y^4 + Iy^6$$

$$r^2 = x^2 + y^2$$

x···MAIN SCANNING DIRECTION COORDINATE    K···CONIC CONSTANT
y···SUB SCANNING DIRECTION COORDINATE     A,B,C,D,E,F,G,H,I···ASPHERIC COEFFICIENT
c···CURVATURE ON OPTICAL AXIS

FIG. 28

SIMULATION CONDITION

| WAVELENGTH | 690[nm] |
|---|---|
| NUMERICAL APERTURE ON IMAGE SIDE | 0.22355 |
| MAIN-SCANNING SPOT GROUP WIDTH Wsgm | 0.582[mm] |
| SUB-SCANNING SPOT GROUP WIDTH Wsgs | 0.058[mm] |
| MAGNIFICATION | −0.5039 |

FIG. 29

CONFIGURATION OF LENS CROSS SECTION OF FIRST LENS LS1
IN LONGITUDINAL DIRECTION LGD

| CURVATURE AT LENS CENTER | 0.674 |
|---|---|
| LENS DIAMETER | 1.66[mm] |
| SAG OF LENS | 0.23[mm] |
| CURVATURE AT LENS OUTER PERIPHERAL PORTION | 0.448 |
| INCLINATION OF TANGENT AT LENS OUTER PERIPHERAL PORTION | 0.555 |

FIG. 30

CONFIGURATION OF LENS CROSS SECTION OF FIRST LENS LS1
IN WIDTH DIRECTION LTD

| CURVATURE AT LENS CENTER | 0.556 |
|---|---|
| LENS DIAMETER | 1.74[mm] |
| SAG OF LENS | 0.23[mm] |
| CURVATURE AT LENS OUTER PERIPHERAL PORTION | 0.372 |
| INCLINATION OF TANGENT AT LENS OUTER PERIPHERAL PORTION | 0.502 |

FIG. 31

CONFIGURATION OF LENS CROSS SECTION OF SECOND LENS LS2
IN LONGITUDINAL DIRECTION LGD

| CURVATURE AT LENS CENTER | 0.785 |
|---|---|
| LENS DIAMETER | 1.66[mm] |
| SAG OF LENS | 0.25[mm] |
| CURVATURE AT LENS OUTER PERIPHERAL PORTION | 0.047 |
| INCLINATION OF TANGENT AT LENS OUTER PERIPHERAL PORTION | 0.534 |

FIG. 32

CONFIGURATION OF LENS CROSS SECTION OF SECOND LENS LS2
IN WIDTH DIRECTION LTD

| CURVATURE AT LENS CENTER | 0.775 |
|---|---|
| LENS DIAMETER | 1.65[mm] |
| SAG OF LENS | 0.25[mm] |
| CURVATURE AT LENS OUTER PERIPHERAL PORTION | 0.370 |
| INCLINATION OF TANGENT AT LENS OUTER PERIPHERAL PORTION | 0.592 |

LINE HEAD AND AN IMAGE FORMING APPARATUS

CROSS REFERENCE TO RELATED APPLICATION

The disclosure of Japanese Patent Applications No. 2008-010606 filed on Jan. 21, 2008 and No. 2008-294708 filed on Nov. 18, 2008 including specification, drawings and claims is incorporated herein by reference in its entirety.

BACKGROUND

1. Technical Field

The present invention relates to a line head comprising lenses formed from a resin material and on a glass substrate and a light emitting element substrate having a light emitting element mounted thereon, as well as to an image forming apparatus employing the line head.

2. Related Art

As such a line head, a line head in which each lens is provided for a plurality of light emitting elements and lights from the light emitting elements are imaged by the lenses to expose an image plane such as a latent image carrier surface is known. For example, in a line head disclosed in Japanese Patent No. 2801838, a plurality of light emitting element groups (corresponding to a plurality of light emitting diodes provided on a light emitting diode element array in Japanese Patent No. 2801838) formed by grouping a plurality of light emitting elements are aligned in a longitudinal direction. One lens is provided for each light emitting element group in the lens array and the light emitting element groups emit light beams toward the lenses.

SUMMARY

By the way, a lens array aiming at increasing the lens diameter may be formed by arranging a plurality of lens rows in a transverse direction (a second direction) each of which includes a plurality of lenses arranged in a longitudinal direction (a first direction). In this lens array, the plural lenses are arranged two-dimensionally. The lens array can be produced by using a so-called mold having recesses formed in conformity with the lens configuration. According to JP-A-2005-276849 for example, a light curing resin is filled in the recesses of the mold while the glass substrate and the mold (a mold 112 in JP-A-2005-276849) are held in contact with each other. The light curing resin is cured by irradiating light thereon whereby the lenses are formed on the glass substrate. After completing the curing of the light curing resin, the mold is released from the lenses and the glass substrate (mold release). This mold releasing operation is efficiently accomplished by virtue of the deformation of the lenses as the resin mass in conjunction with temperature change during the formation of the lenses. Specifically, the lenses shrink due to the temperature change so as to be released from the mold. Hence, the lens array can be easily released from the mold.

However, the lens array employing the glass substrate has the following problem in terms of mold releasability. In general, glass has a low linear expansion coefficient and hence, the glass substrate essentially comprised of glass exhibits a small quantity of shrinkage associated with temperature change. In some cases, therefore, the glass substrate may interfere with the above-described shrinkage of the lenses associated with temperature change so that the lenses may not be smoothly released from the mold, failing to achieve good mold releasability. This involves the fear of entailing various problems of possible occurrence of defects in the lens, lens characteristic varying from lens to lens and the like.

An advantage of some aspects of the invention is to provide technology enabling an improvement in the mold releasability of a lens array comprising a resin lens arranged on a glass substrate.

According to a first aspect of the invention, there is provided a line head, comprising: a first lens formed from a resin and on a glass substrate; and a light emitting element substrate that has light emitting elements arranged in a first direction, wherein a cross section of the first lens taken in the first direction and including an optical axis of the first lens has a configuration wherein a curvature of the first lens at the optical axis has a larger absolute value than a curvature of an outer peripheral portion of the first lens.

According to a second aspect of the invention, there is provided an image forming apparatus, comprising: an exposure unit that includes a lens formed from a resin and on a glass substrate, and a light emitting element substrate having light emitting elements arranged in a first direction; an image carrier on which a latent image is formed by means of the exposure unit; and a developer that develops the latent image formed on the image carrier, wherein a cross section of the lens taken in the first direction and including an optical axis of the lens has a configuration wherein a curvature of the lens at the optical axis has a larger absolute value than a curvature of an outer peripheral portion of the lens.

According to the invention (the line head, image forming apparatus) having such a constitution, the lens is formed from the resin and on the glass substrate and the mold is separated from the lens and the glass substrate in the first direction when the lens and glass substrate are released from the mold. Hence, irregular stresses are exerted on the lens and the glass substrate during the mold releasing operation. Namely, a comparatively great stress is exerted on the lens and the glass substrate in the first direction when they are released from the mold. In this connection, the invention has the constitution wherein a cross section of the first lens taken in the first direction and including an optical axis of the first lens has a configuration wherein a curvature of the first lens at the optical axis has a larger absolute value than a curvature of an outer peripheral portion of the first lens. Thus, the first lens is decreased in the angle of tangent to the outer peripheral portion with respect to the first direction so that the outer peripheral portion of the first lens is configured to be more releasable from the mold. In a case where the lens array comprises such lens and glass substrate, therefore, the lens array is improved in the mold releasability. The first lens may also be finished such that the cross section of the first lens taken in the first direction and including the optical axis of the first lens has a configuration wherein the curvature of the outer peripheral portion of the first lens and the curvature of the first lens at the optical axis have mutually opposite signs.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

FIGS. 1 and 2 are diagrams showing terminology used in this specification.

FIG. 7 is a perspective view of the lens array.

FIG. 11 is a diagram showing the configuration of the light emitting element group provided on the under surface of the head substrate.

FIG. 12 is a plan view of the lens array.

FIG. 17 is a diagram showing the relation of the spot groups, the lens diameter and the like.

FIG. 25 is a table showing data on an optical system according to Example 1.

FIG. 28 is a table showing conditions used upon calculating optical paths shown in FIGS. 26 and 247 by a simulation.

FIG. 29 shows lens data representing the configuration of a lens cross section of a first lens taken in a longitudinal direction thereof.

FIG. 30 shows lens data representing the configuration of a lens cross section of the first lens taken in a width direction thereof.

FIG. 31 shows lens data representing the configuration of a lens cross section of the second lens taken in a longitudinal direction thereof.

FIG. 32 shows lens data representing the configuration of a lens cross section of the second lens taken in a width direction thereof.

DESCRIPTION OF EXEMPLARY EMBODIMENTS

Terms used in this specification are first described below (see "A. Description of Terms"). Following this description of terms, a basic construction of an image forming apparatus including a line head as an application subject of the invention (see "B. Basic Construction") and a basic operation of the line head (see "C. Basic Operation") are described. Following the description of the basic construction and the basic operation, a construction required for a lens array of the line head according to an embodiment (see "D. Construction Required for Lens Array") is described and a construction of the lens array according to the embodiment of the invention (see "E. Construction of Lens Array in the Embodiment") is described.

A. Description of Terms

Figure 1:
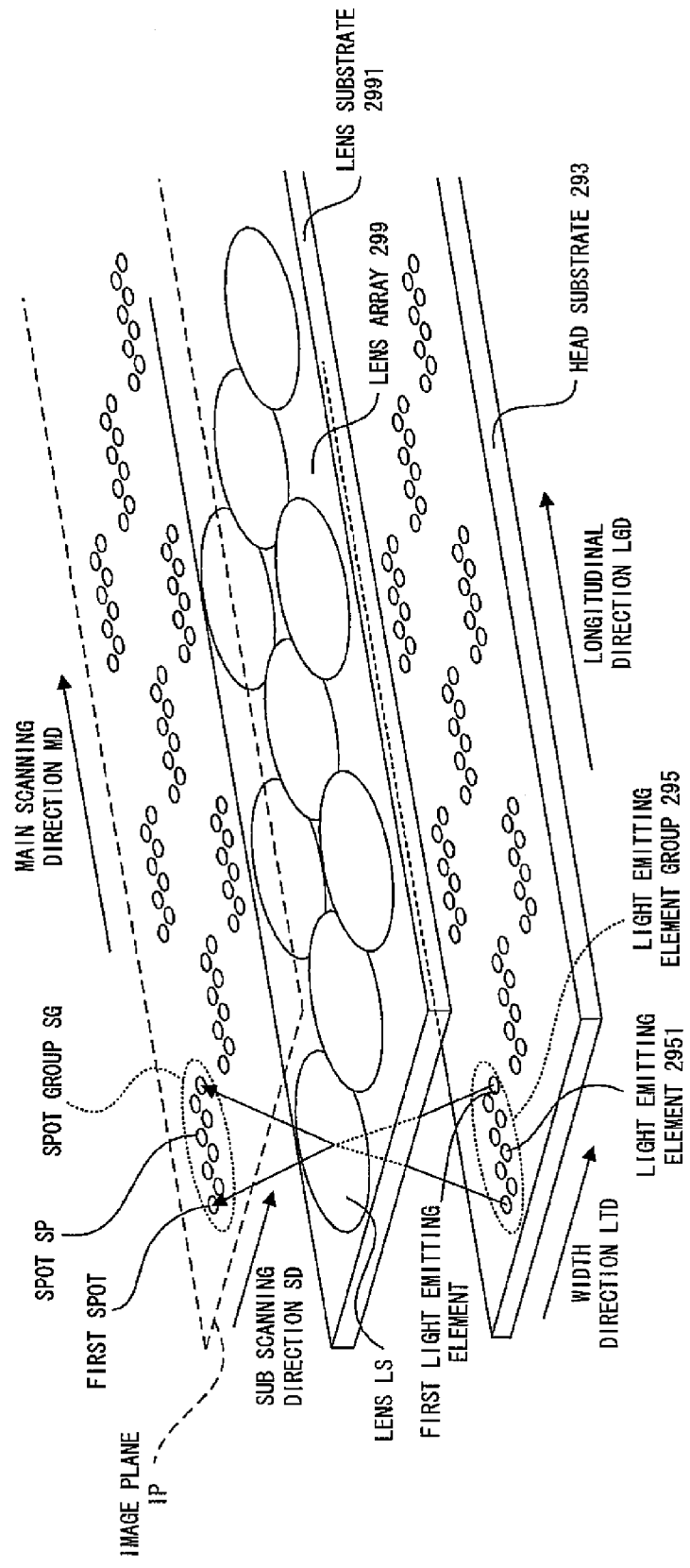

FIGS. 1 and 2 are diagrams showing terminology used in this specification. Here, terminology used in this specification is organized with reference to FIGS. 1 and 2. In this specification, a conveying direction of a surface (image plane IP) of a photosensitive drum 21 is defined to be a sub scanning direction SD and a direction orthogonal to or substantially orthogonal to the sub scanning direction SD is defined to be a main scanning direction MD. Further, a line head 29 is arranged relative to the surface (image plane IP) of the photosensitive drum 21 such that its longitudinal direction LGD corresponds to the main scanning direction M and its width direction LTD corresponds to the sub scanning direction SD.

Collections of a plurality of (eight in FIGS. 1 and 2) light emitting elements 2951 arranged on the head substrate 293 in one-to-one correspondence with the plurality of lenses LS of the lens array 299 are defined to be light emitting element groups 295. In other words, in the head substrate 293, the plurality of light emitting element groups 295 including a plurality of light emitting elements 2951 are arranged in conformity with the plurality of lenses LS, respectively. Further, collections of a plurality of spots SP formed on the image plane IP by light beams from the light emitting element groups 295 imaged on the image plane IP by the lenses LS corresponding to the light emitting element groups 295 are defined to be spot groups SG. In other words, a plurality of spot groups SG can be formed in one-to-one correspondence with the plurality of light emitting element groups 295. In each spot group SG, the most upstream spot in the main scanning direction MD and the sub scanning direction SD is particularly defined to be a first spot. The light emitting element 2951 corresponding to the first spot is particularly defined to be a first light emitting element.

A spot group row SGR and a spot group column SGC are defined as shown in the column "On Image Plane" of FIG. 2. Specifically, a plurality of spot groups SG arranged in the main scanning direction MD are defined as the spot group row SGR. A plurality of spot group rows SGR are arranged at specified spot group row pitches Psgr in the sub scanning direction SD. Further, a plurality of (three in FIG. 2) spot groups SG arranged at spot group row pitches Psgr in the sub scanning direction SD and at spot group pitches Psg in the main scanning direction MD are defined as the spot group column SGC. The spot group row pitch Psgr is a distance in the sub scanning direction SD between the geometric centers of gravity of two spot group rows SGR adjacent in the sub scanning direction SD, and the spot group pitch Psg is a distance in the main scanning direction MD between the geometric centers of gravity of two spot groups SG adjacent in the main scanning direction MD.

Lens rows LSR and lens columns LSC are defined as shown in the column of "Lens Array" of FIG. 2. Specifically, a plurality of lenses LS aligned in the longitudinal direction LGD is defined to be the lens row LSR. A plurality of lens rows LSR are arranged at specified lens row pitches Plsr in the width direction LTD. Further, a plurality of (three in FIG. 2) lenses LS arranged at the lens row pitches Plsr in the width direction LTD and at lens pitches Pls in the longitudinal direction LGD are defined to be the lens column LSC. It should be noted that the lens row pitch Plsr is a distance in the width direction LTD between the geometric centers of gravity of two lens rows LSR adjacent in the width direction LTD, and that the lens pitch Pls is a distance in the longitudinal direction LGD between the geometric centers of gravity of two lenses LS adjacent in the longitudinal direction LGD.

Light emitting element group rows 295R and light emitting element group columns 295C are defined as in the column "Head Substrate" of FIG. 2. Specifically, a plurality of light emitting element groups 295 aligned in the longitudinal direction LGD is defined to be the light emitting element group row 295R. A plurality of light emitting element group rows 295R are arranged at specified light emitting element group row pitches Pegr in the width direction LTD. Further, a plurality of (three in FIG. 2) light emitting element groups 295 arranged at the light emitting element group row pitches Pegr in the width direction LTD and at light emitting element group pitches Peg in the longitudinal direction LGD are defined to be the light emitting element group column 295C. It should be noted that the light emitting element group row pitch Pegr is a distance in the width direction LTD between the geometric centers of gravity of two light emitting element group rows 295R adjacent in the width direction LTD, and that the light emitting element group pitch Peg is a distance in the longitudinal direction LGD between the geometric centers of gravity of two light emitting element groups 295 adjacent in the longitudinal direction LGD.

Light emitting element rows 2951R and light emitting element columns 2951C are defined as in the column "Light emitting element Group" of FIG. 2. Specifically, in each light emitting element group 295, a plurality of light emitting elements 2951 aligned in the longitudinal direction LGD is defined to be the light emitting element row 2951R. A plurality of light emitting element rows 2951R are arranged at specified light emitting element row pitches Pelr in the width direction LTD. Further, a plurality of (two in FIG. 2) light emitting elements 2951 arranged at the light emitting element row pitches Pelr in the width direction LTD and at light emitting element pitches Pel in the longitudinal direction LGD are defined to be the light emitting element column 2951C. It should be noted that the light emitting element row pitch Pelr is a distance in the width direction LTD between the geometric centers of gravity of two light emitting element rows 2951R adjacent in the width direction LTD, and that the light emitting element pitch Pel is a distance in the longitudinal direction LGD between the geometric centers of gravity of two light emitting elements 2951 adjacent in the longitudinal direction LGD.

Spot rows SPR and spot columns SPC are defined as shown in the column "Spot Group" of FIG. 2. Specifically, in each spot group SG, a plurality of spots SP aligned in the longitudinal direction LGD is defined to be the spot row SPR. A plurality of spot rows SPR are arranged at specified spot row pitches Pspr in the width direction LTD. Further, a plurality of (two in FIG. 2) spots arranged at the spot row pitches Pspr in the width direction LTD and at spot pitches Psp in the longitudinal direction LGD are defined to be the spot column SPC. It should be noted that the spot row pitch Pspr is a distance in the sub scanning direction SD between the geometric centers of gravity of two spot rows SPR adjacent in the sub scanning direction SD, and that the spot pitch Psp is a distance in the main scanning direction MD between the geometric centers of gravity of two spots SP adjacent in the main scanning direction MD.

B. Basic Construction

Figure 3:
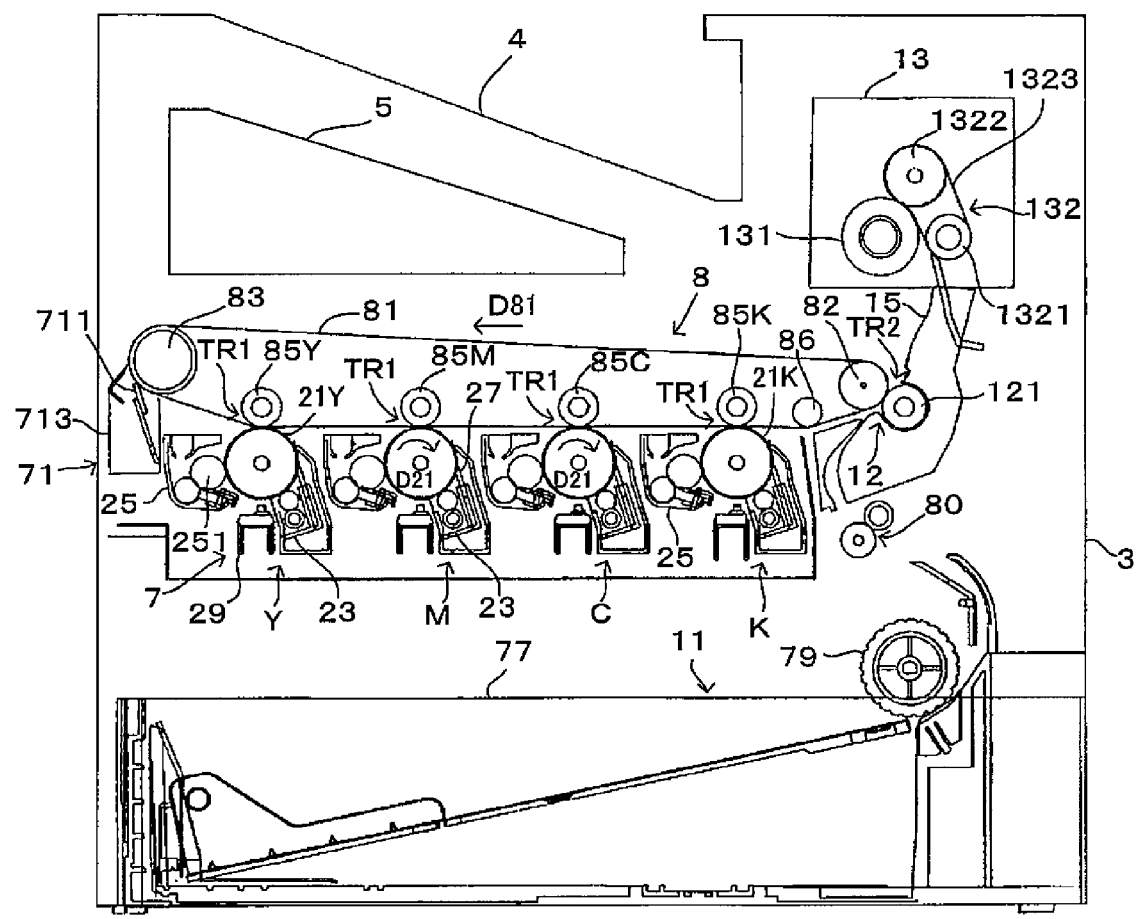
FIG. 3 is a diagram showing an embodiment of an image forming apparatus including a line head as an application subject of the invention.
Figure 4:
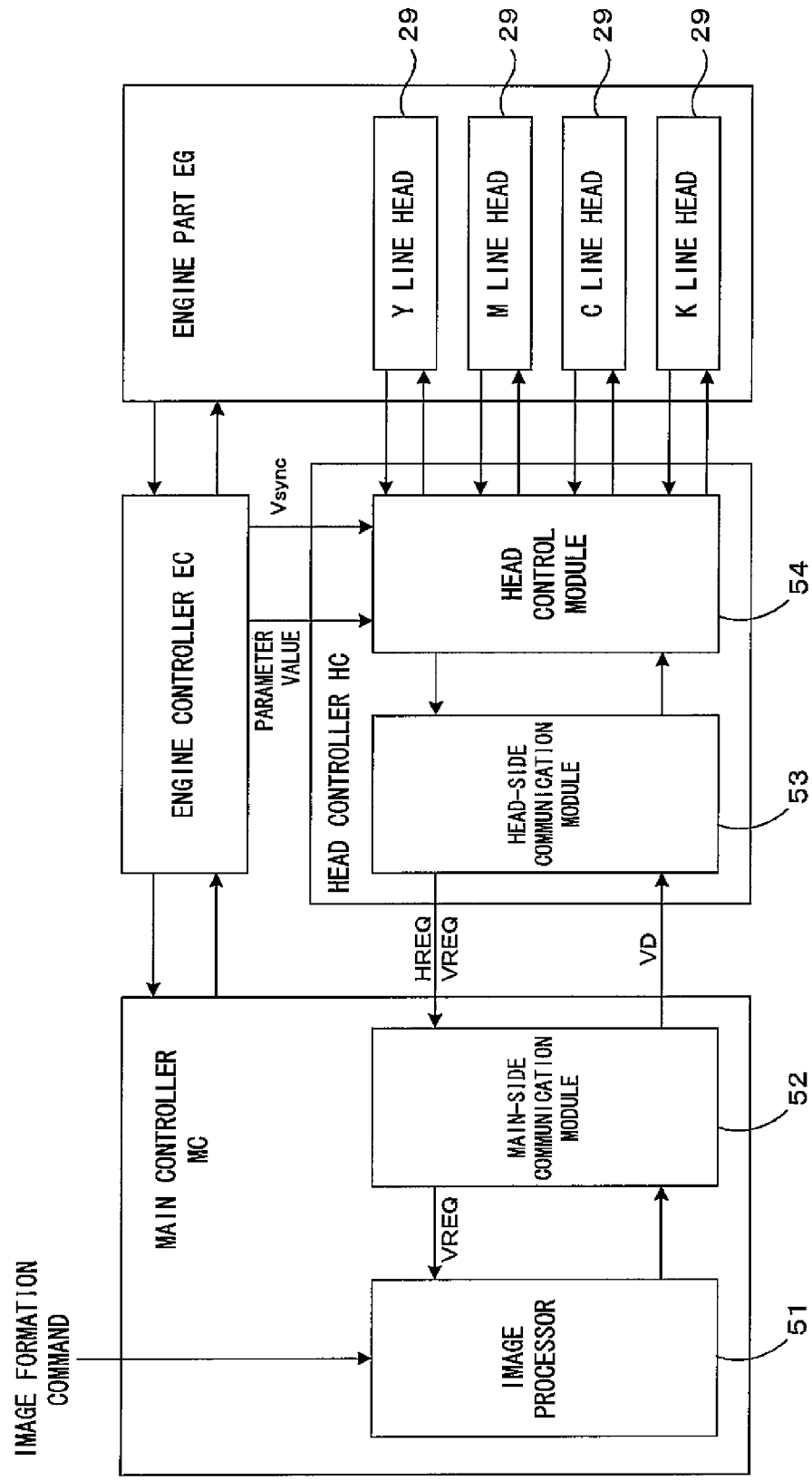
FIG. 4 is a diagram showing the electrical construction of the image forming apparatus of FIG. 3.

FIG. 3 is a diagram showing an embodiment of an image forming apparatus including a line head as an application subject of the invention. FIG. 4 is a diagram showing the electrical construction of the image forming apparatus of FIG. 3. This apparatus is an image forming apparatus that can selectively execute a color mode for forming a color image by superimposing four color toners of black (K), cyan (C), magenta (M) and yellow (Y) and a monochromatic mode for forming a monochromatic image using only black (K) toner. FIG. 3 is a diagram corresponding to the execution of the color mode. In this image forming apparatus, when an image formation command is given from an external apparatus such as a host computer to a main controller MC having a CPU and memories, the main controller MC feeds a control signal and the like to an engine controller EC and feeds video data VD corresponding to the image formation command to a head controller HC. This head controller HC controls line heads 29 of the respective colors based on the video data VD from the main controller MC, a vertical synchronization signal Vsync from the engine controller EC and parameter values from the engine controller EC. In this way, an engine part EG performs a specified image forming operation to form an image corresponding to the image formation command on a sheet such as a copy sheet, transfer sheet, form sheet or transparent sheet for OHP.

An electrical component box 5 having a power supply circuit board, the main controller MC, the engine controller EC and the head controller HC built therein is disposed in a housing main body 3 of the image forming apparatus. An image forming unit 7, a transfer belt unit 8 and a sheet feeding unit 11 are also arranged in the housing main body 3. A secondary transfer unit 12, a fixing unit 13 and a sheet guiding member 15 are arranged at the right side in the housing main body 3 in FIG. 3. It should be noted that the sheet feeding unit 11 is detachably mountable into the housing main body 3. The sheet feeding unit 11 and the transfer belt unit 8 are so constructed as to be detachable for repair or exchange respectively.

The image forming unit 7 includes four image forming stations Y (for yellow), M (for magenta), C (for cyan) and K (for black) which form a plurality of images having different colors. Each of the image forming stations Y, M, C and K includes a cylindrical photosensitive drum 21 having a surface of a specified length in a main scanning direction MD. Each of the image forming stations Y, M, C and K forms a toner image of the corresponding color on the surface of the photosensitive drum 21. The photosensitive drum is arranged so that the axial direction thereof is substantially parallel to the main scanning direction MD. Each photosensitive drum 21 is connected to its own driving motor and is driven to rotate at a specified speed in a direction of arrow D21 in FIG. 3, whereby the surface of the photosensitive drum 21 is transported in the sub scanning direction SD which is orthogonal to or substantially orthogonal to the main scanning direction MD. Further, a charger 23, the line head 29, a developer 25 and a photosensitive drum cleaner 27 are arranged in a rotating direction around each photosensitive drum 21. A charging operation, a latent image forming operation and a toner developing operation are performed by these functional sections. Accordingly, a color image is formed by superimposing toner images formed by all the image forming stations Y, M, C and K on a transfer belt 81 of the transfer belt unit 8 at the time of executing the color mode, and a monochromatic image is formed using only a toner image formed by the image forming station K at the time of executing the monochromatic mode. Meanwhile, since the respective image forming stations of the image forming unit 7 are identically constructed, reference characters are given to only some of the image forming stations while being not given to the other image forming stations in order to facilitate the diagrammatic representation in FIG. 3.

The charger 23 includes a charging roller having the surface thereof made of an elastic rubber. This charging roller is constructed to be rotated by being held in contact with the surface of the photosensitive drum 21 at a charging position. As the photosensitive drum 21 rotates, the charging roller is rotated at the same circumferential speed in a direction driven by the photosensitive drum 21. This charging roller is connected to a charging bias generator (not shown) and charges the surface of the photosensitive drum 21 at the charging position where the charger 23 and the photosensitive drum 21 are in contact upon receiving the supply of a charging bias from the charging bias generator.

The line head 29 is arranged relative to the photosensitive drum 21 so that the longitudinal direction thereof corresponds to the main scanning direction MD and the width direction thereof corresponds to the sub scanning direction SD. Hence, the longitudinal direction of the line head 29 is substantially parallel to the main scanning direction MD. The line head 29 includes a plurality of light emitting elements arrayed in the longitudinal direction and is positioned separated from the photosensitive drum 21. Light beams are emitted from these light emitting elements toward the surface of the photosensitive drum 21 charged by the charger 23, thereby forming an electrostatic latent image on this surface.

The developer 25 includes a developing roller 251 carrying toner on the surface thereof By a developing bias applied to the developing roller 251 from a development bias generator (not shown) electrically connected to the developing roller 251, charged toner is transferred from the developing roller 251 to the photosensitive drum 21 to develop the latent image formed by the line head 29 at a development position where the developing roller 251 and the photosensitive drum 21 are in contact.

The toner image developed at the development position in this way is primarily transferred to the transfer belt 81 at a primary transfer position TR1 to be described later where the transfer belt 81 and each photosensitive drum 21 are in contact after being transported in the rotating direction D21 of the photosensitive drum 21.

Further, the photosensitive drum cleaner 27 is disposed in contact with the surface of the photosensitive drum 21 downstream of the primary transfer position TR1 and upstream of the charger 23 with respect to the rotating direction D21 of the photosensitive drum 21. This photosensitive drum cleaner 27 removes the toner remaining on the surface of the photosensitive drum 21 to clean after the primary transfer by being held in contact with the surface of the photosensitive drum.

The transfer belt unit 8 includes a driving roller 82, a driven roller (blade facing roller) 83 arranged to the left of the driving roller 82 in FIG. 3, and the transfer belt 81 mounted on these rollers. The transfer belt unit 8 also includes four primary transfer rollers 85Y, 85M, 85C and 85K arranged to face in a one-to-one relationship with the photosensitive drums 21 of the respective image forming stations Y, M, C and K inside the transfer belt 81 when the photosensitive cartridges are mounted. These primary transfer rollers 85Y, 85M, 85C and 85K are respectively electrically connected to a primary transfer bias generator (not shown). As described in detail later, at the time of executing the color mode, all the primary transfer rollers 85Y, 85M, 85C and 85K are positioned on the sides of the image forming stations Y, M, C and K as shown in FIG. 3, whereby the transfer belt 81 is pressed into contact with the photosensitive drums 21 of the image forming stations Y, M, C and K to form the primary transfer positions TR1 between the respective photosensitive drums 21 and the transfer belt 81. By applying primary transfer biases from the primary transfer bias generator to the primary transfer rollers 85Y, 85M, 85C and 85K at suitable timings, the toner images formed on the surfaces of the respective photosensitive drums 21 are transferred to the surface of the transfer belt 81 at the corresponding primary transfer positions TR1 to form a color image.

On the other hand, out of the four primary transfer rollers 85Y, 85M, 85C and 85K, the color primary transfer rollers 85Y, 85M, 85C are separated from the facing image forming stations Y, M and C and only the monochromatic primary transfer roller 85K is brought into contact with the image forming station K at the time of executing the monochromatic mode, whereby only the monochromatic image forming station K is brought into contact with the transfer belt 81. As a result, the primary transfer position TR1 is formed only between the monochromatic primary transfer roller 85K and the image forming station K. By applying a primary transfer bias at a suitable timing from the primary transfer bias generator to the monochromatic primary transfer roller 85K, the toner image formed on the surface of the photosensitive drum 21 is transferred to the surface of the transfer belt 81 at the primary transfer position TR1 to form a monochromatic image.

The transfer belt unit 8 further includes a downstream guide roller 86 disposed downstream of the monochromatic primary transfer roller 85K and upstream of the driving roller 82. This downstream guide roller 86 is so disposed as to come into contact with the transfer belt 81 on an internal common tangent to the primary transfer roller 85K and the photosensitive drum 21 at the primary transfer position TR1 formed by the contact of the monochromatic primary transfer roller 85K with the photosensitive drum 21 of the image forming station K.

The driving roller 82 drives to rotate the transfer belt 81 in the direction of the arrow D81 and doubles as a backup roller for a secondary transfer roller 121. A rubber layer having a thickness of about 3 mm and a volume resistivity of 1000 kΩ·cm or lower is formed on the circumferential surface of the driving roller 82 and is grounded via a metal shaft, thereby serving as an electrical conductive path for a secondary transfer bias to be supplied from an unillustrated secondary transfer bias generator via the secondary transfer roller 121. By providing the driving roller 82 with the rubber layer having high friction and shock absorption, an impact caused upon the entrance of a sheet into a contact part (secondary transfer position TR2) of the driving roller 82 and the secondary transfer roller 121 is unlikely to be transmitted to the transfer belt 81 and image deterioration can be prevented.

The sheet feeding unit 11 includes a sheet feeding section which has a sheet cassette 77 capable of holding a stack of sheets, and a pickup roller 79 which feeds the sheets one by one from the sheet cassette 77. The sheet fed from the sheet feeding section by the pickup roller 79 is fed to the secondary transfer position TR2 along the sheet guiding member 15 after having a sheet feed timing adjusted by a pair of registration rollers 80.

The secondary transfer roller 121 is provided freely to abut on and move away from the transfer belt 81, and is driven to abut on and move away from the transfer belt 81 by a secondary transfer roller driving mechanism (not shown). The fixing unit 13 includes a heating roller 131 which is freely rotatable and has a heating element such as a halogen heater built therein, and a pressing section 132 which presses this heating roller 131. The sheet having an image secondarily transferred to the front side thereof is guided by the sheet guiding member 15 to a nip portion formed between the heating roller 131 and a pressure belt 1323 of the pressing section 132, and the image is thermally fixed at a specified temperature in this nip portion. The pressing section 132 includes two rollers 1321 and 1322 and the pressure belt 1323 mounted on these rollers. Out of the surface of the pressure belt 1323, a part stretched by the two rollers 1321 and 1322 is pressed against the circumferential surface of the heating roller 131, thereby forming a sufficiently wide nip portion between the heating roller 131 and the pressure belt 1323. The sheet having been subjected to the image fixing operation in this way is transported to the discharge tray 4 provided on the upper surface of the housing main body 3.

Further, a cleaner 71 is disposed facing the blade facing roller 83 in this apparatus. The cleaner 71 includes a cleaner blade 711 and a waste toner box 713. The cleaner blade 711 removes foreign matters such as toner remaining on the transfer belt after the secondary transfer and paper powder by holding the leading end thereof in contact with the blade facing roller 83 via the transfer belt 81. Foreign matters thus removed are collected into the waste toner box 713. Further, the cleaner blade 711 and the waste toner box 713 are constructed integral to the blade facing roller 83. Accordingly, if the blade facing roller 83 moves as described next, the cleaner blade 711 and the waste toner box 713 move together with the blade facing roller 83.

Figure 5:
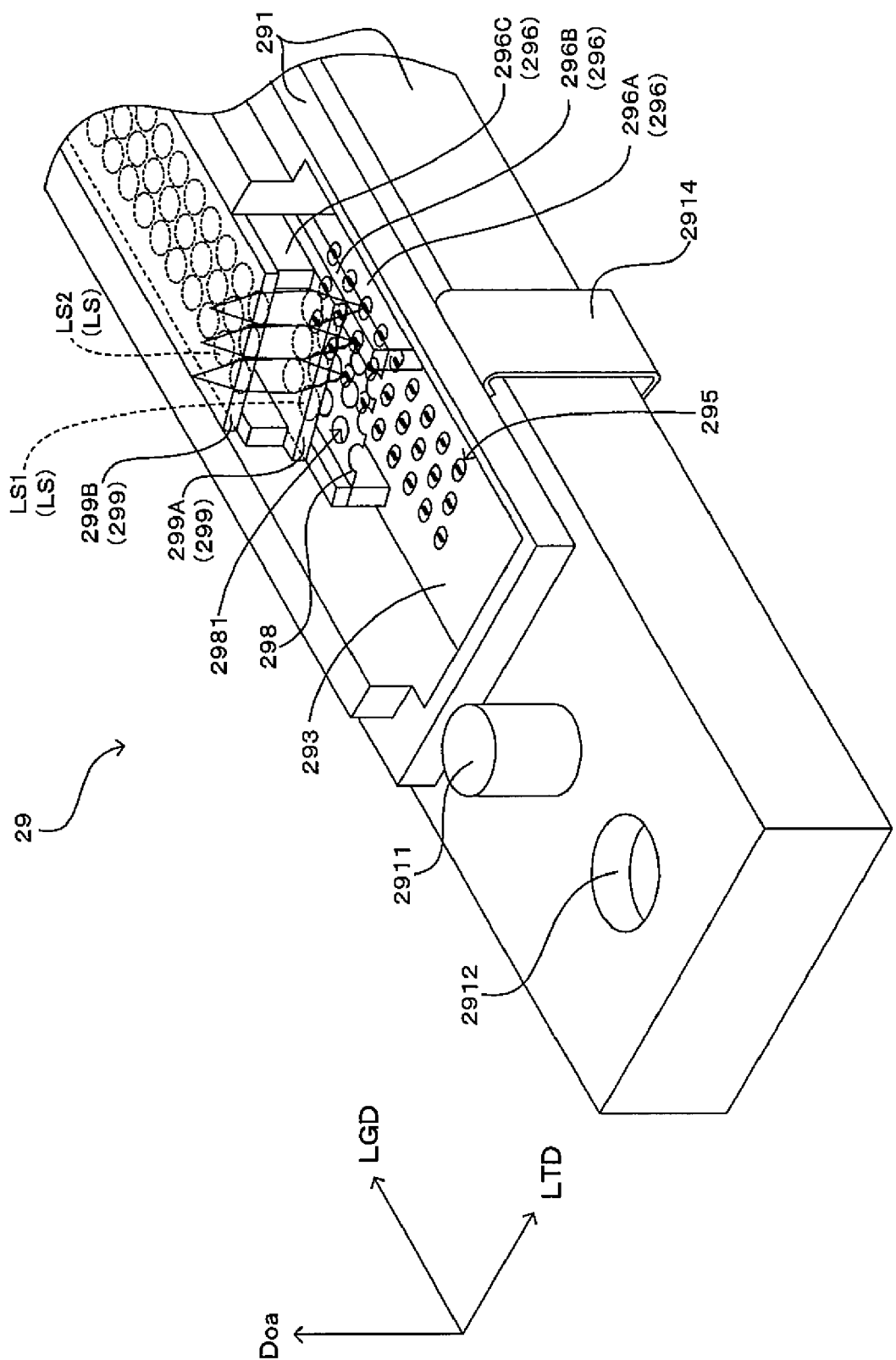
FIG. 5 is a perspective view schematically showing a line head according to the invention.
Figure 6:
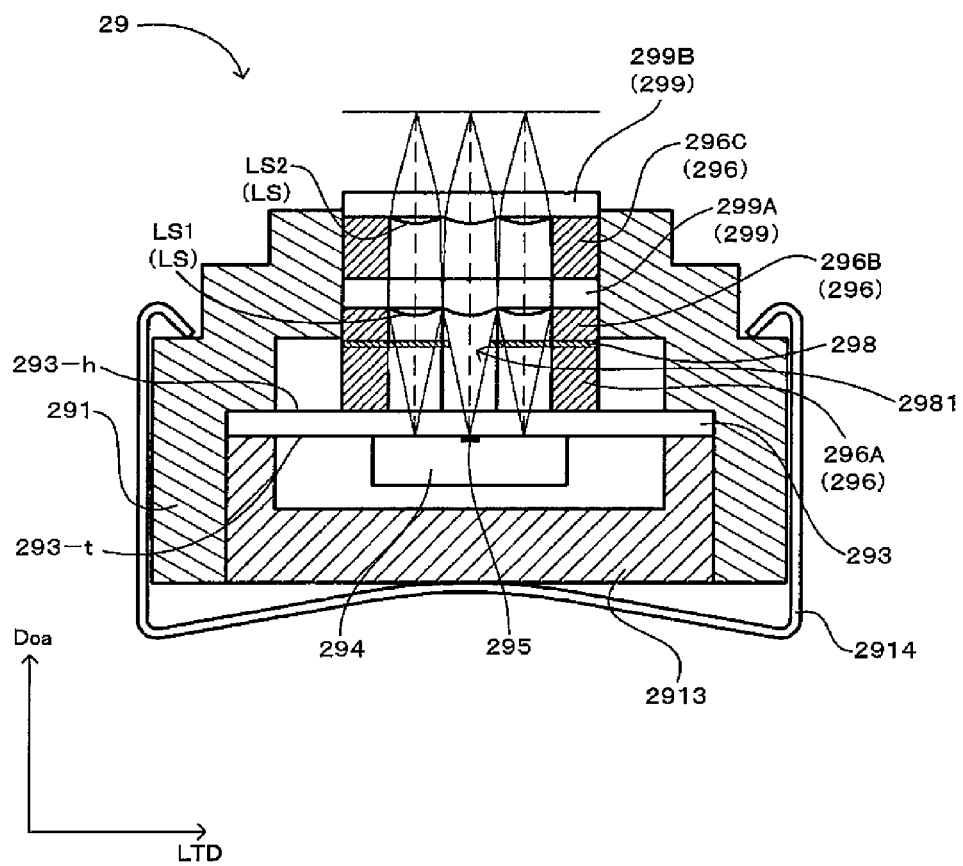
FIG. 6 is a sectional view along a width direction of the line head shown in FIG. 5.

FIG. 5 is a perspective view schematically showing a line head according to the invention, and FIG. 6 is a sectional view along a width direction of the line head shown in FIG. 5. As described above, the line head 29 is arranged relative to the photosensitive drum 21 such that the longitudinal direction LGD thereof corresponds to the main scanning direction MD and the width direction LTD thereof corresponds to the sub scanning direction SD. The longitudinal direction LGD and the width direction LTD are orthogonal to or substantially orthogonal to each other. As described later, in this line head 29, a plurality of light emitting elements are formed on the head substrate 293 and the respective light emitting elements emit light beams toward the surface of the photosensitive drum 21. Accordingly, in this specification, a direction orthogonal to the longitudinal direction LGD and the width direction LTD and propagating from the light emitting elements toward the photosensitive drum surface is referred to as a light beam propagation direction Doa. This light beam propagation direction Doa is parallel to or substantially parallel to optical axes OA to be described later.

The line head 29 includes a case 291, and a positioning pin 2911 and a screw insertion hole 2912 are provided at each of the opposite ends of such a case 291 in the longitudinal direction LGD. The line head 29 is positioned relative to the photosensitive drum 21 by fitting such positioning pins 2911 into positioning holes (not shown) perforated in a photosensitive drum cover (not shown) covering the photosensitive drum 21 and positioned relative to the photosensitive drum 21. Further, the line head 29 is positioned and fixed relative to the photosensitive drum 21 by screwing fixing screws into screw holes (not shown) of the photosensitive drum cover via the screw insertion holes 2912 to be fixed.

The head substrate 293, an aperture plate 298 and two lens arrays 299 (299A, 299B) are arranged in the case 291. The inner side of the case 291 is held in contact with a top surface 293-h of the head substrate 293, whereas an under lid 2913 is held in contact with an under surface 293-t of the head substrate 293. This under lid 2913 is pressed against the inner side of the case 291 via the head substrate 293 by fixing devices 2914. In other words, the fixing devices 2914 have elastic forces for pressing the under lid 2913 toward the inner side (upper side in FIG. 6) of the case 291 and the interior of the case 291 is light-tightly sealed (in other words, so that light does not leak from the interior of the case 291 and light does not enter the case 291 from the outside) by the under lid being pressed by such elastic forces. The fixing devices 2914 are provided at a plurality of positions spaced apart in the longitudinal direction LGD of the case 291.

The light emitting element groups 295 formed by grouping a plurality of light emitting elements are provided on the under surface 293-t of the head substrate 293. The head substrate 293 is made of a light transmissive material such as glass, and light beams emitted from the respective light emitting elements of the light emitting element groups 295 can transmit from the under surface 293-t of the head substrate 293 to the top surface 293-h thereof. These light emitting elements are bottom emission-type organic EL (electro-luminescence) devices and are covered by a sealing member 294.

The aperture plate 298 is opposed to the head substrate 293 via bases 296A. The aperture plate 298 is formed with aperture openings 2981 in correspondence to the respective groups 295 of light emitting elements. The light beam outputted from the light emitting element group 295 is narrowed down by the aperture opening 2981. The two lens arrays 299 are disposed in aligned relation on a downstream side of the aperture plate 298 in the light beam propagation direction Doa. Specifically, the lens array 299A is opposed to the aperture plate 298 via bases 296B and the lens array 299B is opposed to the lens array 299A via bases 296C. The two lens arrays 299A, 299B are each provided with the lenses LS for the respective light emitting element groups 295, so that the light beam from each light emitting element group 295 is incident on each lens LS. In the line head 29, the individual members including the head substrate 293, the aperture plate 298, the lens array 299A and the lens array 299B are arranged in the order named in the light beam propagation direction Doa while the base 296 is interposed between a respective pair of members.

Figure 8:
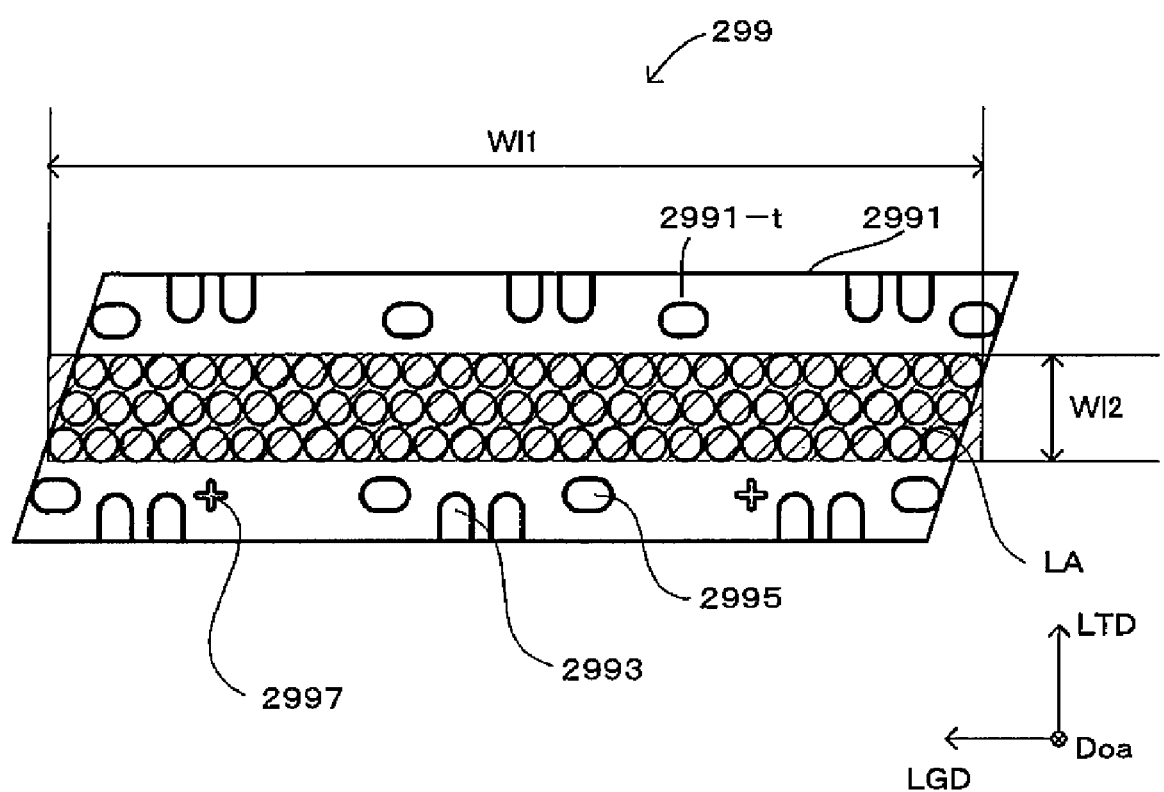
FIG. 8 is a plan view of the lens array.

FIG. 7 is a perspective view of the lens array. FIG. 8 is a plan view of the lens array as seen in the light beam propagation direction Doa. The lens array 299 includes a glass substrate 2991 formed from glass. The glass substrate 2991 is elongated in the longitudinal direction LGD. A lens area LA is provided on a back side 2991-t of the glass substrate 2991. The plural lenses LS are formed in the lens area LA. The lens area LA is configured such that a longitudinal width W11 (width in a first direction) in the longitudinal direction of the lens area LA and a transverse width W12 (width in a second direction) in the width direction LTD are in a relation to satisfy the following expression W11>W12. The lens area LA is elongated in the longitudinal direction LGD. The glass substrate has seat projections 2993, 2995 and alignment marks 2997 attached to places outward of the lens area LA in the width direction LTD. The alignment mark 2997 is used for aligning the lens array 299 with another member when the line head 29 is assembled. The seat projection 2993 is formed with an abutment face 2993F at its end in the width direction LTD. In a state where the lens array 299 is mounted to the case 291, the abutment face 2993F of the seat projection 2993 abuts on the inside of the case 291. Thus, the lens array 299 is positioned relative to the case 291. Alternatively, the lens array and the aperture may be combined into an integral part by bonding the apertures to the seat projections having a smaller height than the seat projections 2993 before the lens array is mounted to the case 291. This permits the lenses and apertures to be positioned with high precisions. Thus is accomplished a high precision assembly of the line head 29. According to the embodiment, the plural lens arrays 299 are arranged in the longitudinal direction LGD. The line head 29 mounted in an image forming apparatus supporting JIS (Japanese Industrial Standards)-A3 size sheet, for example, is required to have a length on the order of 300 mm in the longitudinal direction LGD. However, in light of working accuracy for the lens molding, it is difficult to produce the lens array having the length of 300 mm at the lens area LA thereof. In this embodiment, therefore, the plural lens arrays 299 are arranged in the longitudinal direction LGD.

Such a lens array 299 can be formed using a method shown in FIG. 9A to FIG. 9D, for example. Specifically, a light curing resin 91 is supplied onto the back side 2991-*t* (lens forming surface) of the glass substrate 2991 (a light transparent substrate). The supply of the resin is adjusted to a quantity corresponding to the lenses LS. Subsequently, a mold 93 including recesses 92 conforming to the configuration of the lenses LS is brought into contact with the back side 2991-*t* of the glass substrate 2991 and pressed thereagainst. Thus, the light curing resin 91 is filled in space between the mold 93 and the glass substrate 2991. A UV light is irradiated on the glass substrate 2991 from a front side 2991-*h* thereof so as to cure the light curing resin 91. Thus, the lenses LS are formed on the glass substrate 2991 (see FIG. 9B).

Figure 9:
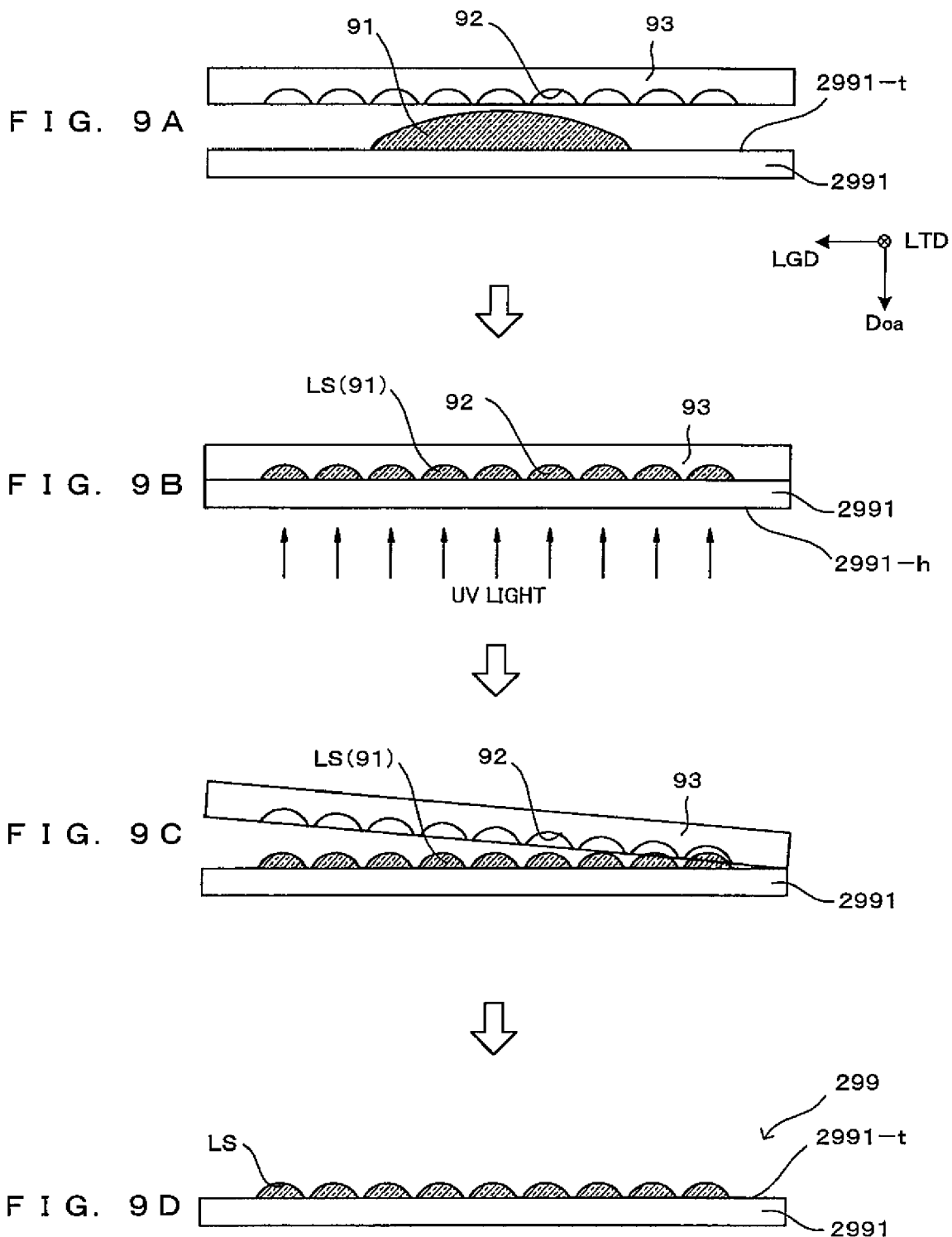
FIGS. 9A, 9B, 9C and 9D are diagrams showing a method of manufacturing the lens array.

Next, the mold 93 is released from the lens array 299. The glass substrate 2991 employed by the embodiment has a so-called elongated configuration wherein the length in the longitudinal direction LGD is greater than the length in the width direction LTD. It is therefore impracticable to carry out the mold releasing operation by uniformly separating the mold 93 from the back side 2991-*t* of the glass substrate 2991. Hence, as shown in FIG. 9C, one end (the left-hand end as seen in FIG. 9C) of the mold 93 in the longitudinal direction LGD is first separated from the back side 2991-*t* of the glass substrate 2991 and is farther spaced away therefrom whereby the mold is sequentially released from the one end (the left-hand end as seen in FIG. 9C) to the other end (the right-hand end as seen in FIG. 9C). The mold releasing operation is completed by separating the other end (the right-hand end as seen in FIG. 9D) from the back side 2991-*t* of the glass substrate 2991 (FIG. 9D). Since the lens array 299 is formed in this manner, the lenses LS and the glass substrate 991 are subjected to irregular stresses during the mold releasing operation. Namely, the comparatively great stresses are exerted on the lenses LS and the glass substrate 2991 in the longitudinal direction LGD during the mold releasing operation.

Figure 10:
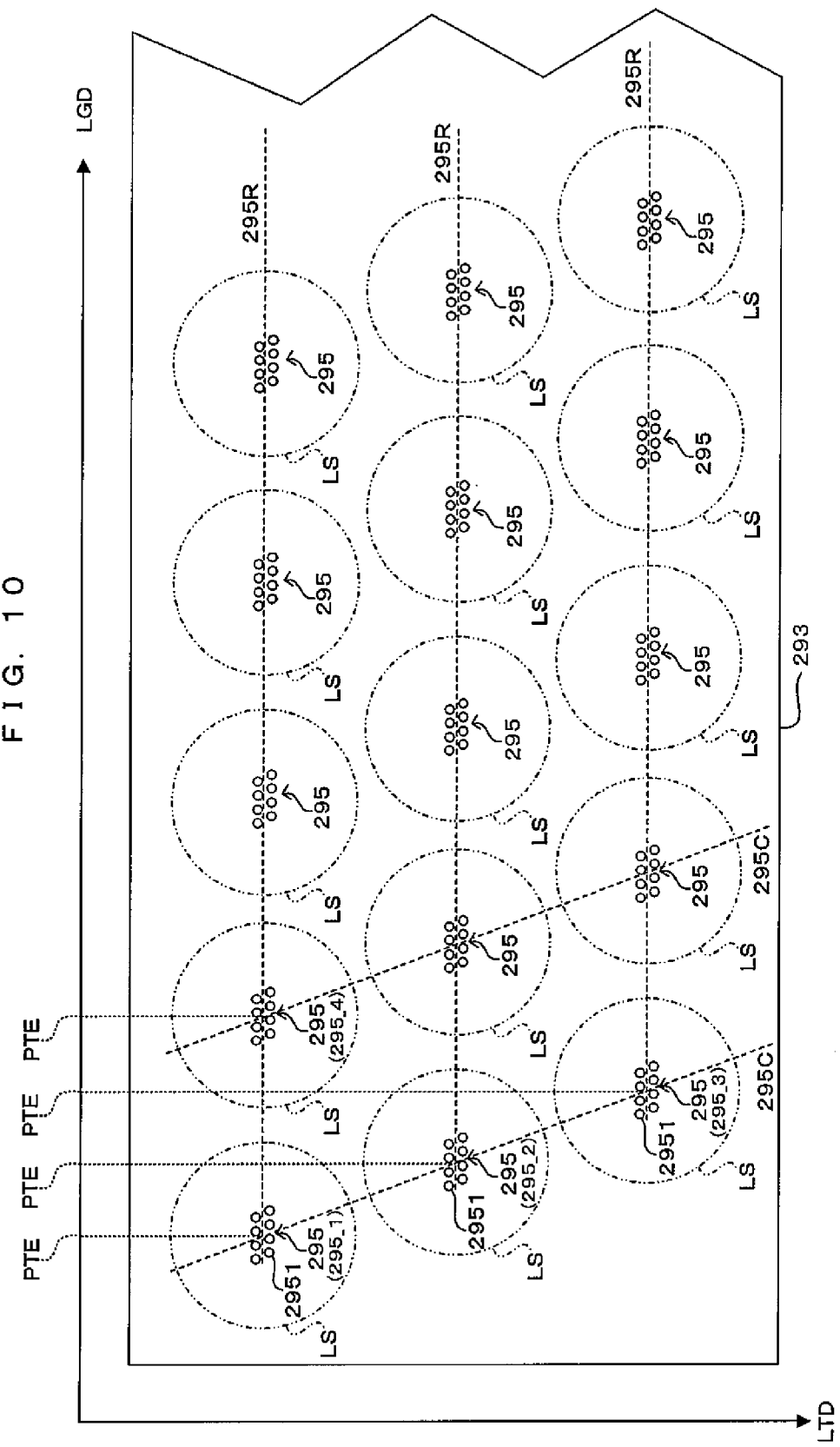
FIG. 10 is a diagram showing the configuration of the under surface of the head substrate.

FIG. 10 is a diagram showing the configuration of the under surface of the head substrate and corresponds to a case where the under surface is seen from the top surface of the head substrate. FIG. 11 is a diagram showing the configuration of the light emitting element group provided on the under surface of the head substrate. Although the lenses LS are shown by chain double-dashed line in FIG. 10, this is to show that the light emitting element groups 295 are provided in a one-to-one correspondence with the lenses LS, but not to show that the lenses LS are arranged on the under surface of the head substrate. As shown in FIG. 10, the light emitting element group 295 is formed by grouping eight light emitting elements 2951. In each light emitting element group 295, eight light emitting elements 2951 are arranged as follows. Specifically, as shown in FIG. 11, in the light emitting element group 295, four light emitting elements 2951 are aligned in the longitudinal direction LGD to form a light emitting element row 2951R and two light emitting element rows 2951R are arranged at a light emitting element row pitch Pelr in the width direction LTD. The respective light emitting element rows 2951R are displaced from each other in the longitudinal direction LGD, so that the positions of the respective light emitting elements 2951 in the longitudinal direction LGD differ from each other. The light emitting element group 295 thus configured has a longitudinal light emitting element group width W295*gm* in the longitudinal direction LGD and a widthwise light emitting element group width W295*gs* in the width direction LTD, wherein the longitudinal light emitting element group width W295*gm* is larger than the widthwise light emitting element group width W295*gs*.

A plurality of light emitting element groups 295 thus configured are arranged on the under surface 293-*t* of the head substrate 293. Specifically, a plurality of light emitting element group columns 295C, in each of which three light emitting element groups 295 are arranged at positions mutually different in the width direction LTD, are arranged in the longitudinal direction LGD. In other words, three light emitting element group rows 295R each formed by aligning a plurality of light emitting element groups 295 in the longitudinal direction LGD are arranged in the width direction LTD. The respective light emitting element group rows 295R are displaced from each other in the longitudinal direction LGD, so that positions PTE of the respective light emitting element groups 295 in the longitudinal direction LGD mutually differ. Thus, in this embodiment, a plurality of light emitting element groups 295 are two-dimensionally arranged on the head substrate 293. In FIG. 10, the positions of the light emitting element groups 295 are represented by the center of gravity positions of the light emitting element groups 295, and the positions PTE of the light emitting element groups 295 in the longitudinal direction LGD are indicated by feet of perpendiculars to an axis of the longitudinal direction LGD from the positions of the light emitting element groups 295.

The respective light emitting elements 2951 formed on the head substrate 293 in this way emit light beams having an equal wavelength upon being driven, for example, by a TFT (Thin Film Transistor) circuit or the like. The light emitting surfaces of the light emitting elements 2951 are so-called perfectly diffusing surface illuminants and the light beams emitted from the light emitting surfaces comply with Lambert's cosine law.

FIG. 12 is a plan view of the lens array and corresponds to a case where the lens array is seen from an image plane side (upper side in FIG. 6). In the lens array 299, the lenses LS are provided for the respective light emitting element groups 295. Specifically, as shown in FIG. 12, in the lens array 299, a plurality of lens columns LSC each made up of three lenses LS arranged at different positions in the width direction LTD are arranged in the longitudinal direction LGD. In other words, in the lens array 299, three lens rows LSR each formed by aligning a plurality of lenses LS in the longitudinal direction LGD are arranged in the width direction LTD. The respective lens rows LSR are displaced from each other in the longitudinal direction LGD, so that positions PTL of the respective lenses LS in the longitudinal direction LGD mutually differ. In this way, a plurality of lenses LS are two-dimensionally arranged in the lens array 299. In FIG. 12, the positions of the lenses LS are represented by the centers of lens surfaces LSF of the lenses LS and the positions PTL of the lenses LS in the longitudinal direction LGD are represented by feet of perpendiculars to the axis of the longitudinal direction LGD from the centers of the lenses LS.

Figure 13:
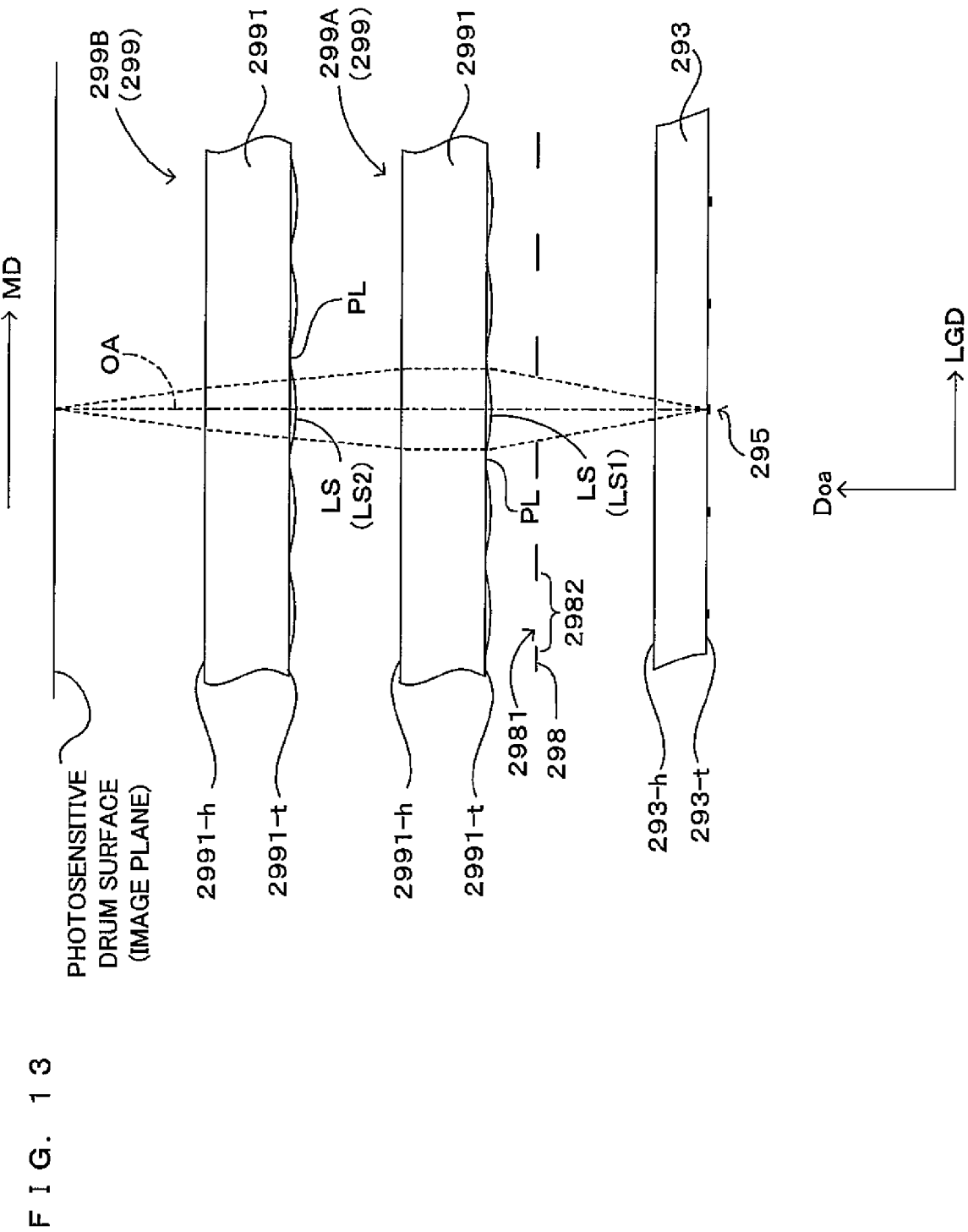
FIG. 13 is a longitudinal sectional view of the lens arrays, the head substrate and the like showing a longitudinal cross section including an optical axis of the lens formed in the lens array.

FIG. 13 is a sectional view of the lens array, the head substrate and the like taken in the longitudinal direction, showing a longitudinal cross section including the optical axis of the lenses LS formed in the lens array. As described above, the lens array 299 includes the glass substrate 2991 elongated in the longitudinal direction LGD. The front side 2991-*h* of the glass substrate is formed flat, while the back side 299-*t* thereof is formed with the lenses LS in correspondence to the respective groups 295 of light emitting elements. Accordingly, portions with a finite curvature where the lenses LS are formed and flat portions PL with an infinite curvature by having no lenses LS formed are present on the under surface 299-*h*.

In this line head 29, two lens arrays 299 (299A, 299B) having such a configuration are arranged side by side in the light beam propagation direction Doa, so that two lenses LS1, LS2 aligned in the light propagation direction Doa are arranged for each light emitting element group 295 (FIGS. 5, 6 and 13). An optical axis OA (chain double-dashed line in FIG. 13) passing the centers of the first and second lenses LS1, LS2 corresponding to the same light emitting element group 295 is orthogonal to or substantially orthogonal to the under surface 293-*t* of the head substrate 293. Here, the lens LS of the line head 299A upstream in the light beam propagation direction Doa is the first lens LS1, and that of the line head 299B downstream in the light beam propagation direction Doa is the second lens LS2. In this way, since a plurality of lens arrays 299 are arranged side by side in the light beam propagation direction Doa in this embodiment, a degree of flexibility in optical design can be increased.

The aperture plate 298 is disposed upstream of the lens arrays 299A, 299B in the light beam propagation direction Doa. The aperture plate 298 is formed with the aperture openings 2981 in correspondence to the respective light emitting element groups 295. Hereinafter, the aperture opening 2981 and its peripheral area will be referred to as "a diaphragm 2982". The diaphragm 2982 is provided in correspondence to each light emitting element group 295. The diaphragms 2982 are provided in this manner such as to prevent the unwanted light beam from becoming incident on the lenses LS.

Thus, the line head 29 comprises an imaging optical system including the aperture plate 298 and the first and second lenses LS1, LS2. Out of the light beams outputted from the light emitting element group 295, therefore, those light beams through the aperture opening 2981 are focused by the first lens LS1 and the second lens LS2. In this way, the light beams are imaged by the first and the second lenses LS1, LS2 to form spots SP on the photosensitive drum surface (image plane). On the other hand, the photosensitive drum surface is charged by the charger 23 prior to spot formation as described above. Thus, areas where the spots SP are formed are neutralized to form spot latent images Lsp. The spot latent images Lsp thus formed are conveyed toward a downstream side in the sub scanning direction SD while being carried on the photosensitive drum surface. As described in the next "C. Basic Operation", the spots SP are formed at timings in conformity with the movement of the photosensitive drum surface to form a plurality of spot latent images Lsp aligned in the main scanning direction MD.

C. Basic Operation

Figure 14:
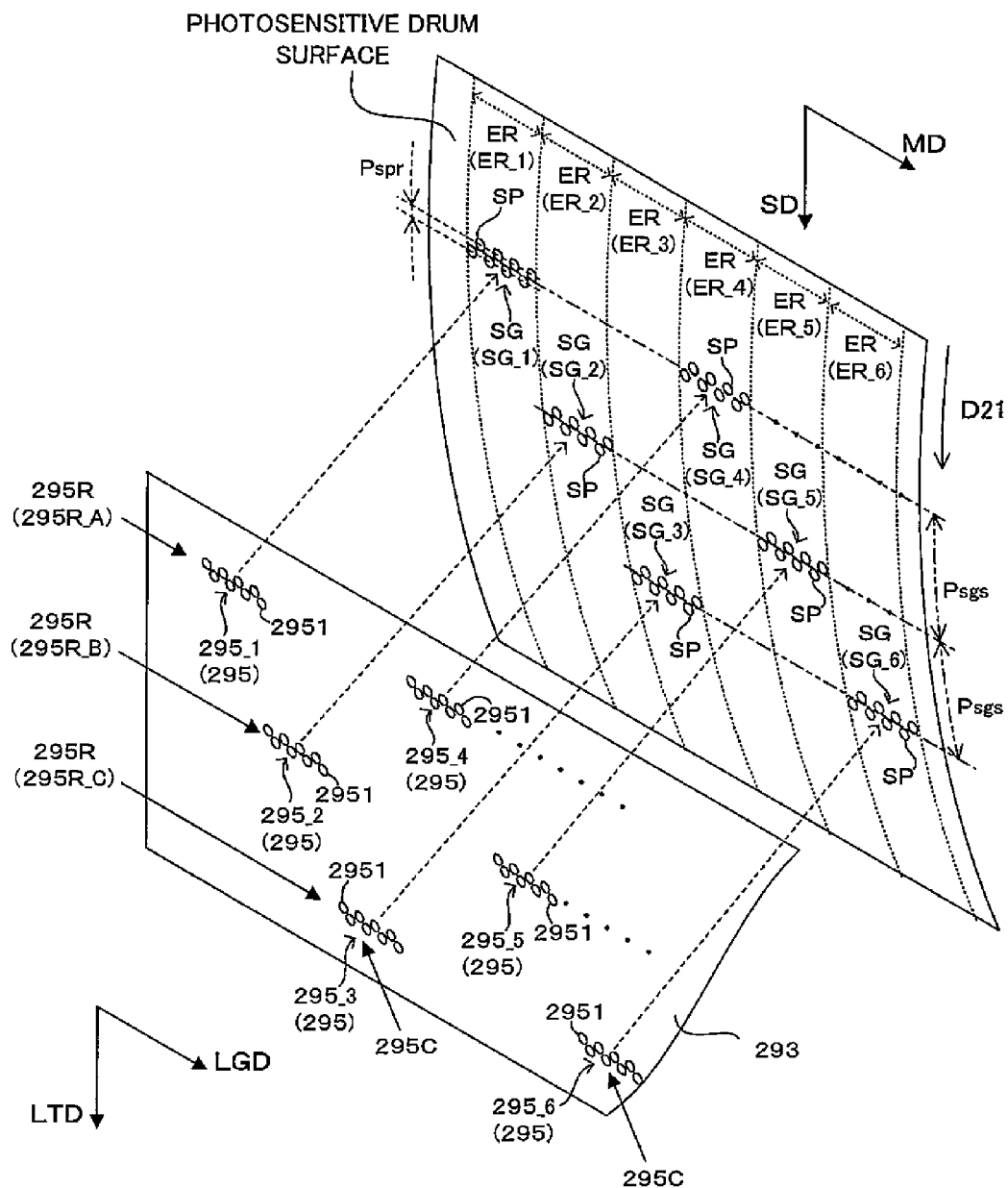
FIG. 14 is a perspective view showing spots formed by the line head.

FIG. 14 is a perspective view showing spots formed by the line head. The lens array 299 is not shown in FIG. 14. As shown in FIG. 14, the respective light emitting element groups 295 can form the spot groups SG in exposure regions ER mutually different in the main scanning direction MD. Here, the spot group SG is a set of a plurality of spots SP formed by the simultaneous light emissions of all the light emitting elements 2951 of the light emitting element group 295. As shown in FIG. 14, three light emitting element groups 295 capable of forming the spot groups SG in the exposure regions ER consecutive in the main scanning direction MD are displaced from each other in the width direction LTD. In other words, three light emitting element groups 295_1, 295_2 and 295_3 capable of forming spot groups SG_1, SG_2 and SG_3, for example, in exposure regions ER_1, ER_2 and ER_3 consecutive in the main scanning direction MD are displaced from each other in the width direction LTD. These three light emitting element groups 295 constitute the light emitting element group column 295C, and a plurality of light emitting element group columns 295C are arranged in the longitudinal direction LGD. As a result, three light emitting element group rows 295R_A, 295R_B and 295R_C are arranged in the width direction LTD and the respective light emitting element group rows 295R_A, etc. form the spot groups SG at positions mutually different in the sub scanning direction SD as already described in the description of FIG. 8.

Specifically, in this line head 29, the plurality of light emitting element groups 295 (for example, light emitting element groups 295_1, 295_2, 295_3) are arranged at positions mutually different in the width direction LTD. The respective light emitting element groups 295 arranged at the positions mutually different in the width direction LTD form spot groups SG (for example, spot groups SG_1, SG_2, SG_3) at positions mutually different in the sub scanning direction SD.

In other words, in this line head 29, the plurality of light emitting elements 2951 are arranged at positions mutually different in the width direction LTD. For example, the light emitting elements 2951 belonging to the light emitting element group 295_1 and those belonging to the light emitting element group 295_2 are arranged at positions mutually different in the width direction LTD. The respective light emitting elements 2951 arranged at the positions mutually different in the width direction LTD form spots SP at positions mutually different in the sub scanning direction SD. For example, spots SP belonging to the spot group SG_1 and those belonging to the spot group SG_2 are formed at positions mutually different in the sub scanning direction SD.

In this way, the formation positions of the spots SP in the sub scanning direction SD differ depending on the light emitting elements 2951. Accordingly, in order to form a plurality of spot latent images Lsp side by side in the main scanning direction MD (that is, in order to form a plurality of spot latent images Lsp side by side at the same position in the sub scanning direction SD), differences in such spot formation positions need to be considered. Thus, in this line head 29, the respective light emitting elements 2951 are driven at timings in conformity with the movement of the photosensitive drum surface.

Figure 15:
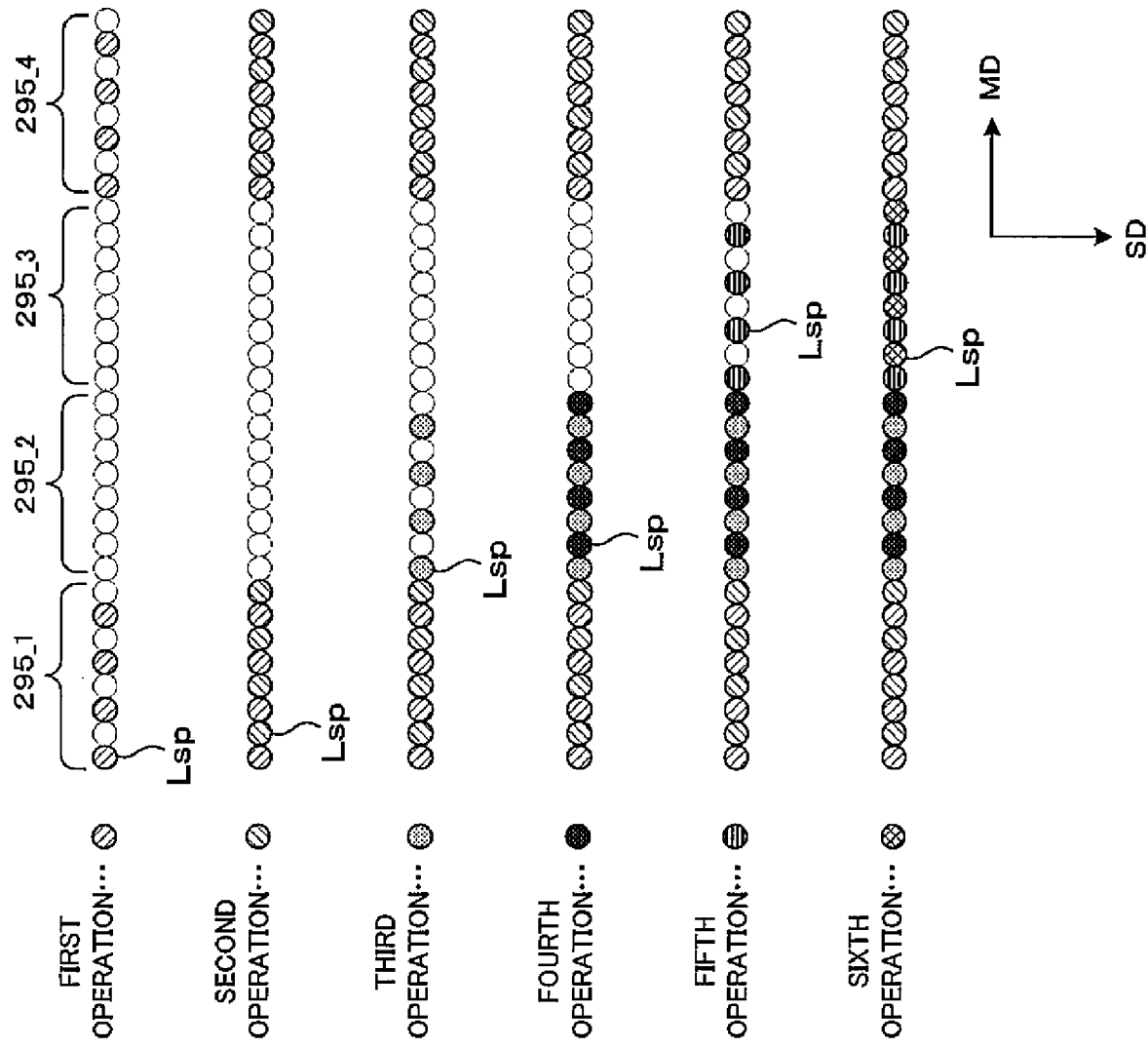
FIG. 15 is a diagram showing a spot forming operation by the above line head.

FIG. 15 is a diagram showing a spot forming operation by the above line head. The spot forming operation by the line head is described with reference to FIGS. 10, 14 and 15. Briefly, the photosensitive drum surface (latent image carrier surface) is moved in the sub scanning direction SD and the head control module 54 (FIG. 4) drives the light emitting elements 2951 for light emission at timings in conformity with the movement of the photosensitive drum surface, whereby a plurality of spot latent images Lsp arranged in the main scanning direction MD are formed.

First of all, out of the light emitting element rows 2951R (FIG. 14) belonging to the most upstream light emitting element groups 295_1, 295_4, and the like in the width direction LTD, the light emitting element rows 2951R downstream in the width direction LTD are driven for light emission. A plurality of light beams emitted by such a light emitting operation are imaged by the lenses LS to form spots SP on the photosensitive drum surface. The lenses LS have an inversion characteristic, so that the light beams from the light emitting elements 2951 are imaged in an inverted manner. In this way, spot latent images Lsp are formed at hatched positions of a "First Operation" of FIG. 15. In FIG. 15, white circles represent spots that are not formed yet, but planned to be formed later. In FIG. 15, spots labeled by reference numerals 295_1 to 295_4 are those to be formed by the light emitting element groups 295 corresponding to the respective attached reference numerals.

Subsequently, out of the light emitting element rows 2951R belonging to the most upstream light emitting element groups 295_1, 295_4, and the like in the width direction, the light emitting element rows 2951R upstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Second Operation" of FIG. 15. Here, the light emitting element rows 2951R are successively driven for light emission from the one downstream in the width direction LTD in order to deal with the inversion characteristic of the lenses LS.

Subsequently, out of the light emitting element rows 2951R belonging to the second most upstream light emitting element groups 295_2 and the like in the width direction, the light emitting element rows 2951R downstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Third Operation" of FIG. 15.

Subsequently, out of the light emitting element rows 2951R belonging to the second most upstream light emitting element groups 295_2 and the like in the width direction, the light emitting element rows 2951R upstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Fourth Operation" of FIG. 15.

Subsequently, out of the light emitting element rows 2951R belonging to the third most upstream light emitting element groups 295_3 and the like in the width direction, the light emitting element rows 2951R downstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Fifth Operation" of FIG. 15.

Finally, out of the light emitting element rows 2951R belonging to the third most upstream light emitting element groups 295_3 and the like in the width direction, the light emitting element rows 2951R upstream in the width direction LTD are driven for light emission. A plurality of light beams emitted by such a light emitting operation are imaged by the lenses LS to form spots SP on the photosensitive drum surface. In this way, spot latent images Lsp are formed at hatched positions of a "Sixth Operation" of FIG. 15. By performing the first to sixth light emitting operations in this way, a plurality of spots SP are successively formed from the upstream ones in the sub scanning direction SD to form a plurality of spot latent images Lsp aligned in the main scanning direction MD.

D. Construction Required for Lens Array

As described above, in the lens array 299, a plurality of lenses LS are two-dimensionally arranged. Accordingly, a construction required for such a lens array 299 is thought. As generally known, a diameter "a" at which airy disk intensity is zero is determined by the following formula due to the influence of light diffraction.

$$a = 1.22 \cdot \lambda / NAimg \quad \text{(Formula 1)}$$
$$= 1.22 \cdot \lambda / \sin(\theta)$$

Here, $\lambda$ is the wavelength of the light beams, NAimg is an image-side numerical aperture and $\theta$ is an aperture angle (half angle). Thus, the shape of the spots SP on the image plane is, due to the influence of diffraction, enlarged from the shape determined by the shape of the light emitting elements 2951 as a light source and the aberrations of the optical system. According to this formula 1, the enlargement of the spot SP is about 5.5 [μm] when the aperture angle (half angle) is 8 [degrees] and the wavelength is 630 [nm]. This is equivalent to 25% or more of a pixel pitch (that is, pitch between spot latent images Lsp formed adjacent to each other) in the case of a resolution of 1200 dpi (dots per inch). Thus, in light of performing optical writing at a high resolution, the influence of diffraction on the spot shape is preferably not larger than this. In other words, it is preferable to suppress the enlargement of the spots SP caused by diffraction by setting the image-side aperture angle (half angle) to about 8 [degrees] or larger.

Although the line head 29 is used in proximity to the image plane (surface to be irradiated), a minimum clearance S (spacing between the line head 29 and the image plane) is necessary to avoid problems such as the interference of parts and discharge. In the case of employing an image-side telecentric optical system to make a writing position variation (variation of the positions of the spots SP on the photosensitive drum surface) difficult to occur due to the variation of the clearance S caused by the vibration of the surface of the photosensitive drum 21 or the like, the following formula needs to be satisfied.

$$Wlpm \geq 2 \cdot S^* \tan(\theta) \cdot m/(m-1) \quad \text{(Formula 2)}$$

Here, m is the number (row number) of the lens rows LSR. Wlpm is the width of a beam passage area LP on an optical system final surface in the main scanning direction MD (longitudinal direction LGD). The optical system final surface is an optical surface located closest to a non-image plane side. In the optical system shown in FIG. 13, the front side 2991-*h* of the glass substrate in the lens array 299B corresponds to the final surface in the optical system. The beam passage area LP is a range where a light beam passes on a target optical surface. How to derive the formula 2 is described later.

In the actual lens array manufacturing, surface accuracy tends to be difficult to obtain near the outer peripheries of lenses. Accordingly, a lens diameter DM is preferably the sum of the width of the beam passage area LP and a margin of about several 10 [μm]. Here, when the margin of the lens diameter is α, a lens diameter DMm (main-scanning lens diameter DMm) in the main scanning direction MD (longitudinal direction LGD) is given by the following formula.

$$DMm = Wlpm + \alpha \quad \text{(Formula 3)}$$

In order to suppress interference between the adjacent lenses LS in the lens array 299, width Wsgm of the spot groups SG in the main scanning direction MD (main-scanning spot group width Wsgm) with respect to the main-scanning lens diameter DMn needs to be set in a range determined by the following formula.

$$Wsgm > DMm/m \quad \text{(Formula 4)}$$

Accordingly, when the image-side aperture angle θ is 8 [degrees], the clearance S is 1 [mm] and the margin a of the lens diameter is 0.1 [mm], the lens diameter and the main-scanning spot group width Wsgm are as follows. Specifically, when the number m of the lens rows LSR is 2, it is necessary that DMm>0.66 [mm] and Wsgm>DMn/2=0.33 [mm]. Further, when the number m of the lens rows LSR is 3, it is necessary that DMm>0.52 [mm] and Wsgm>Dm/3=0.173 [mm]. Furthermore, when the number m of the lens rows LSR is 4, it is necessary that DMm>0.47 [mm] and Wsgm>DMm/4=0.1175 [mm]. In this way, the lens array 299 needs to have such a construction in which the lenses having a diameter of about 0.5 [mm] or larger are two-dimensionally arranged.

Figure 16:
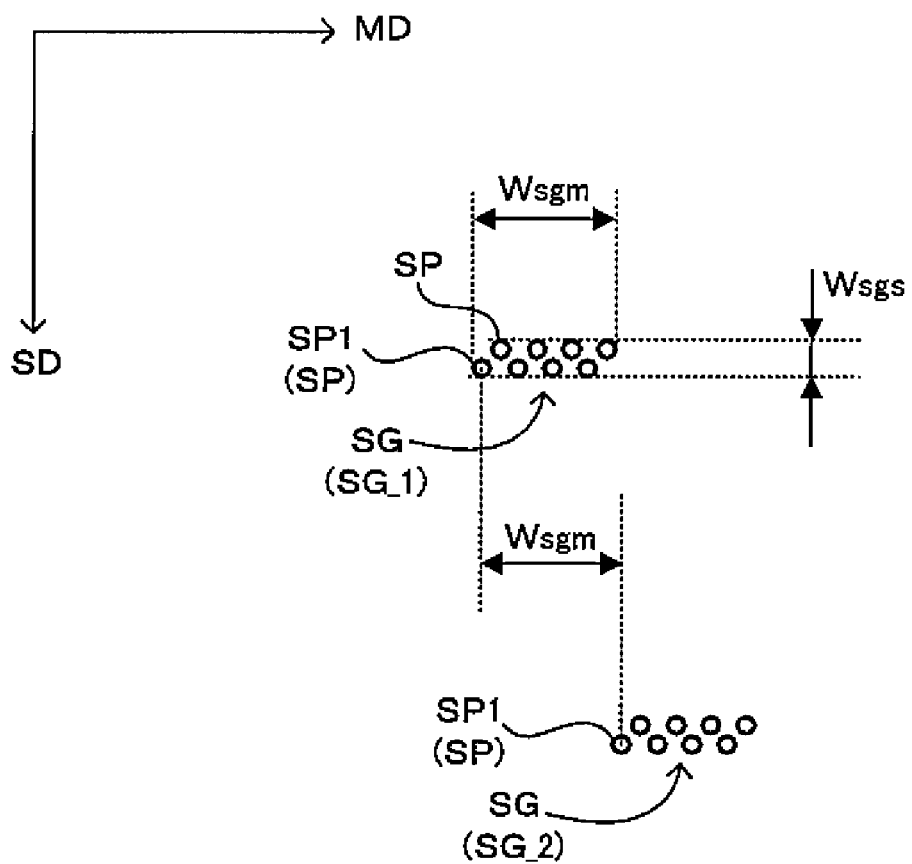
FIG. 16 is a diagram showing the spot groups formed on the image plane.

Here, the formula 2 is derived. This formula 2 is derived from a relation to be satisfied by the spot groups and the lens diameter. Accordingly, after quantities concerning the spot group are described using FIG. 16, the formula 2 is derived using FIGS. 17 and 18. FIG. 16 is a diagram showing the spot groups formed on the image plane. As shown in FIG. 16, the spot group SG has the main-scanning spot group width Wsgm in the main scanning direction MD and a sub-scanning spot group width Wsgs in the sub scanning direction SD. As shown in FIG. 16, this main-scanning spot group width Wsgm can be calculated as a pitch between the first spots SP1 of the two spot groups SG (for example, spot groups SG1, SG2 in FIG. 14) formed in adjacent exposure regions ER. Here, the first spots SP1 are the most upstream spots SP of the respective spot groups SG in the main scanning direction MD.

Figure 17:
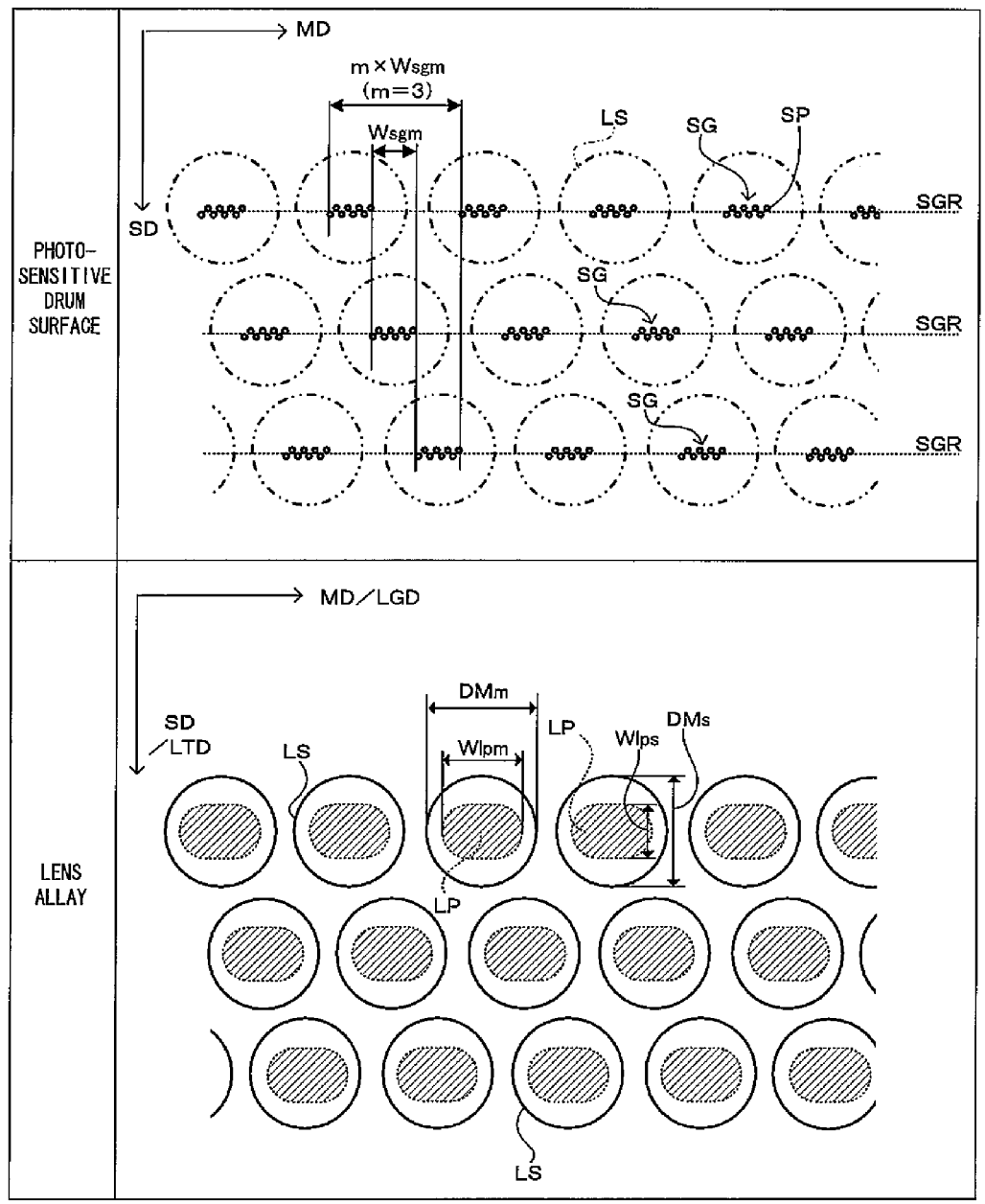
Figure 18:
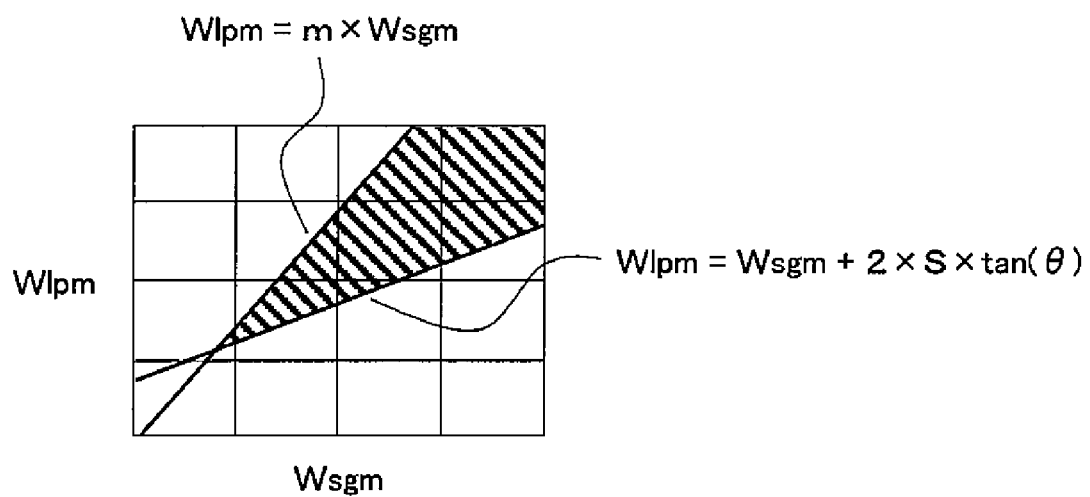
FIG. 18 is a diagram showing a relation of the spot groups and the beam passage areas of the optical system final surfaces.

FIG. 17 is a diagram showing the relation of the spot groups, the lens diameter and the like, and FIG. 18 is a diagram showing a relation of the spot groups and the beam passage areas of the optical system final surfaces. The column "Lens Array" of FIG. 17 shows a relation of the lenses LS and the beam passage areas LP in the lenses LS. Further, the diameter of the lenses LS in the main scanning direction MD (longitudinal direction LGD) is shown as the main-scanning lens diameter Dfin and the diameter of the lenses LS in the sub scanning direction SD (width direction LTD) is shown as the sub-scanning lens diameter DMs. Furthermore, the width of the beam passage areas LP in the main scanning direction MD (longitudinal direction LGD) is shown as the main-scanning passage area width Wlpm and the width of the beam passage areas LP in the sub scanning direction SD (width direction LTD) is shown as a sub-scanning passage area width Wlps. As shown in FIG. 11, in the light emitting element group 295, the longitudinal light emitting element group width W295gm is larger than the widthwise light emitting element group width W295gs. Accordingly, the main-scanning passage area width Wlpm is larger than the sub-scanning passage area width Wlps. In the column "photosensitive Drum Surface" of FIG. 17, the spot groups SG formed on the photosensitive drum surface (image plane) are shown. Chain double-dashed lines in this column are the projections of the lenses LS for forming the respective spot groups on the photosensitive drum surface.

A pitch (intra-row lens pitch) between adjacent lenses LS in the lens row SGR can be expressed as (m·Wsgm). Since this intra-row lens pitch needs to be larger than the width Wlpm of the beam passage areas LP in the respective lenses in the main scanning direction MD for the arrangement of the lenses LS, the following formula needs to be satisfied.

$$L \leq m \cdot Wsgm \quad \text{(Formula 5)}$$

Further, in order to suppress a variation in the formation positions of the spots SP (incident positions of the beam spots SP) resulting from a variation in the distance between the image plane (surface to be irradiated) and the line head 29, the following formula holds in the case of constructing the optical system to have a substantially telecentric image side.

$$Wlpm/2 \geq Wsgm/2 + S \tan(\theta)$$

When the both sides of this formula are doubled, the following formula is obtained.

$$Wlpm \geq Wsgm + 2 \cdot S \tan(\theta) \quad \text{(Formula 6)}$$

When the formulas 5 and 6 are plotted, taking Wsgm in the horizontal axis and Wlpm in the vertical axis, a graph shown in FIG. 18 is obtained and a hatched range of FIG. 18 satisfies the both formulas. When an intersection of the two lines in FIG. 18 is calculated and a range of Wlpm corresponding to the hatched part is calculated, the following formula is derived.

$$Wlpm \geq 2 \cdot S^* \tan(\theta) \cdot m/(m-1) \quad \text{(Formula 2)}$$

E. Construction of the Lens Array in This Embodiment

As described above, the embodiment uses the mold 93 for producing the lens array 299, so that the comparatively great stress is exerted on the lenses LS and the glass substrate 2991 in the longitudinal direction LGD when the lenses are released from the mold. In order to improve the mold releasability of the lens array 299, therefore, it is important to finish the outer peripheral portion of the lens in such a configuration prone to be released from the mold 93.

The above-described study indicates that the lens is required to have a diameter of about 0.5 [mm] or more in order to construct the lens array 299 wherein each group of light emitting elements 295 is provided with one lens LS and wherein these lenses LS are arranged two-dimensionally. In the lens array 299, the lenses having the comparatively great diameter of 0.5 [mm] as a micro-lens are arranged two-dimensionally so that concave/convex patterns are arranged in closely spaced relation. The lens array 299 having the concave/convex patterns closely spaced leads to a tendency that the mold is less releasable when the lens array is formed. Particularly, the following problem in terms of the mold releasability is encountered by the lens array 299 of the embodiment wherein the lenses LS are formed from the resin and on the glass substrate 2991. Specifically, the glass generally has the low linear expansion coefficient and hence, the glass substrate 2991 essentially comprised of glass exhibits a small quantity of shrinkage associated with temperature change. Accordingly, it is sometimes difficult to achieve the good mold releasability because the shrinkage of the lenses LS associated with temperature change is hindered by the glass substrate 2991 so that the lenses LS are not smoothly released from the mold. This results in the fear of raising various problems that defects are introduced into the lenses LS, that the lens characteristic varies from lens LS to lens LS, and the like.

Hence, the embodiment is constituted such that a section of the lens taken in the longitudinal direction LGD and including the optical axis OA of the imaging optical system has a configuration wherein a curvature of the outer peripheral portion OC of the lens has an opposite sign to a curvature of the lens at the center CT or a smaller absolute value than the curvature of the lens at the lens center CT. Thus, an angle of tangent at the lens outer peripheral portion OC with respect to the longitudinal direction LGD is suppressed to a small value and each lens LS is so shaped as to be easily released from the mold. In addition, provided that an area of the glass substrate 2991 that is formed with the lenses is defined as the lens area LA, the longitudinal width W11 of the lens area LA as determined in the longitudinal direction and the transverse width W12 thereof as determined in the width direction LTD satisfy the relation (W11>W12). With respect to the longitudinal direction LGD, therefore, the lens area LA provided on the glass substrate 2991 exhibits a comparatively great quantity of shrinkage associated with temperature change. According to the embodiment, the outer peripheral portion OC of the lens is configured to be more releasable from the mold with respect to the longitudinal direction LGD in which the lens area LA exhibits the comparatively great quantity of shrinkage associated with temperature change. As a result, the lens array 299 can be improved in the mold releasability. In this regard, a detailed description will be made as follows. Unless otherwise stated, all the terms "lens section", "lens cross section" and "the cross section of the lens" represent the cross section of the lens LS including the optical axis OA.

Figure 19:
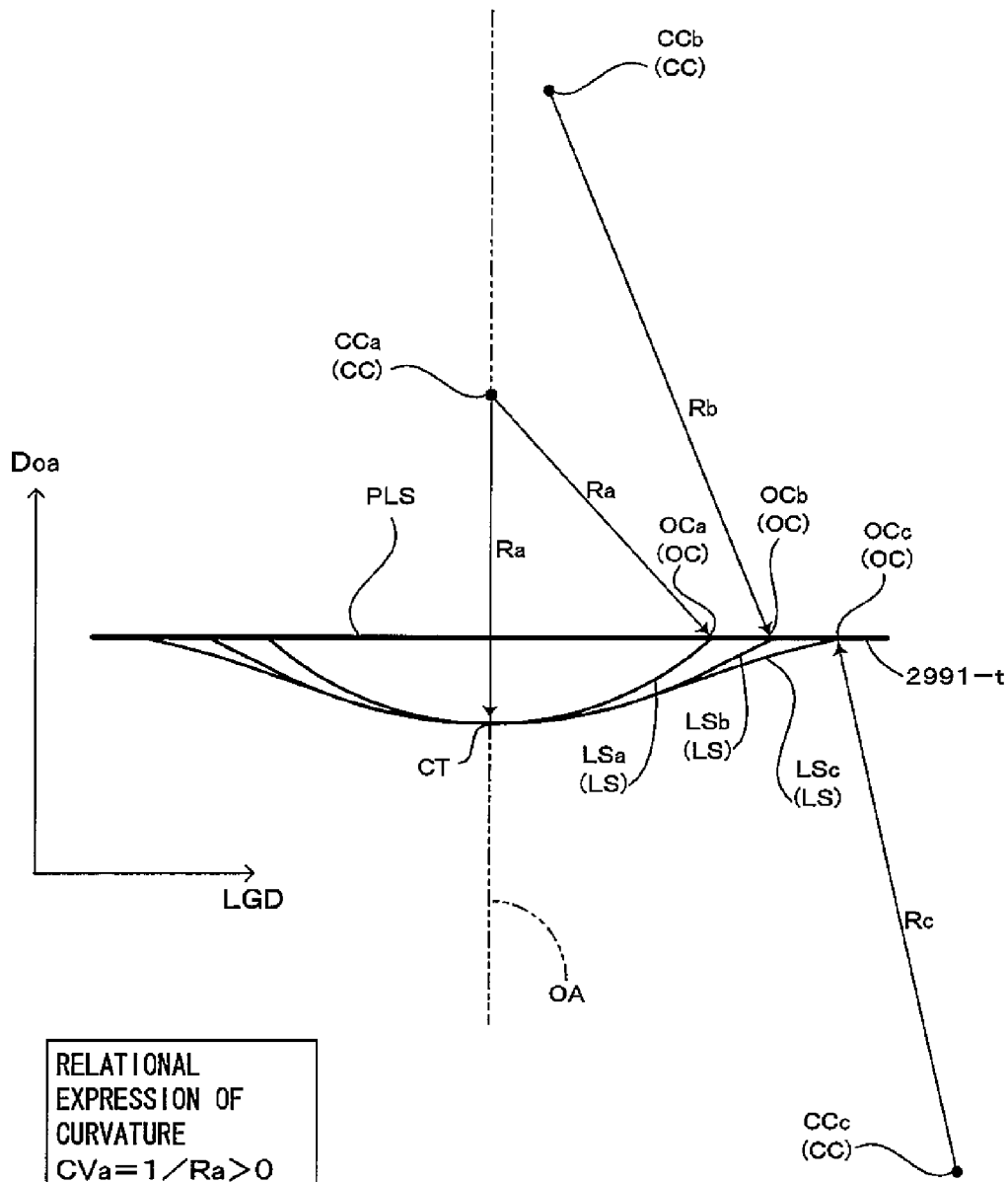
FIG. 19 is a diagram showing the cross sections of the lenses including the lens center.

FIG. 19 shows a cross section of the lens taken in the longitudinal direction and including the lens center. The cross section includes the optical axis OA of the lens LS. A lens LSb or LSc shown in FIG. 19 corresponds to a lens according to the invention. A lens LSa is shown for the comparison with the lens according to the invention. The lenses LSa, LSb and LSc are all formed on the lens array top surface 299-*h*. In FIG. 19, the lenses LSa, LSb and LSc are shown in an overlapping manner so that the lens centers thereof coincide, and have sags of the same size. Further, the respective lenses LSa, LSb and LSc have an equal radius of curvature Ra at the lens centers CT.

In FIG. 19, a curvature center CC of the lens LSa is expressed as a curvature center CCa, a curvature center CC of the lens LSb is expressed as a curvature center CCb, and a curvature center CC of the outer peripheral portion of the lens LSc is expressed as a curvature center CCc. A curvature CV in this specification can be defined as follows (see a rectangular enclosure in FIG. 19). In other words, the absolute values of curvatures CV (CVa, CVb, CVc) are inverses of the radii of curvatures R (Ra, Rb, Rc). When the curvature center CC is located in a space before (downstream in the direction Doa) the lens surface of the lens LS in the light beam propagation direction Doa, the curvature CV given by the curvature center CC is positive. On the other hand, when the curvature center CC is located in a space behind (upstream in the direction Doa) the lens surface of the lens LS in the light beam propagation direction Doa, the curvature CV given by the curvature center CC is negative.

Referring to the lens cross sections taken in the longitudinal direction LGD, as shown in FIG. 19, an outer peripheral portion OC of the lens LSa is represented by OCa, an outer peripheral portion OC of the lens LSb is represented by OCb, and an outer peripheral portion OC of the lens LSc is represented by OCc. The outer peripheral portion OC of the lens LS herein is defined as follows. A boundary between a flat plane PLS including the flat end portion PL and the lens LS defines the lens outer peripheral portion. In other words, a boundary between the resin and the glass substrate 2991 is equivalent to the lens outer peripheral portion OC because the resin forms the lens LS on the glass substrate 2991 according to the embodiment. Description by way of the angle of tangent to the lens outer peripheral portion will be made hereinafter and hence, the angle of tangent is defined as follows.

Figure 20:
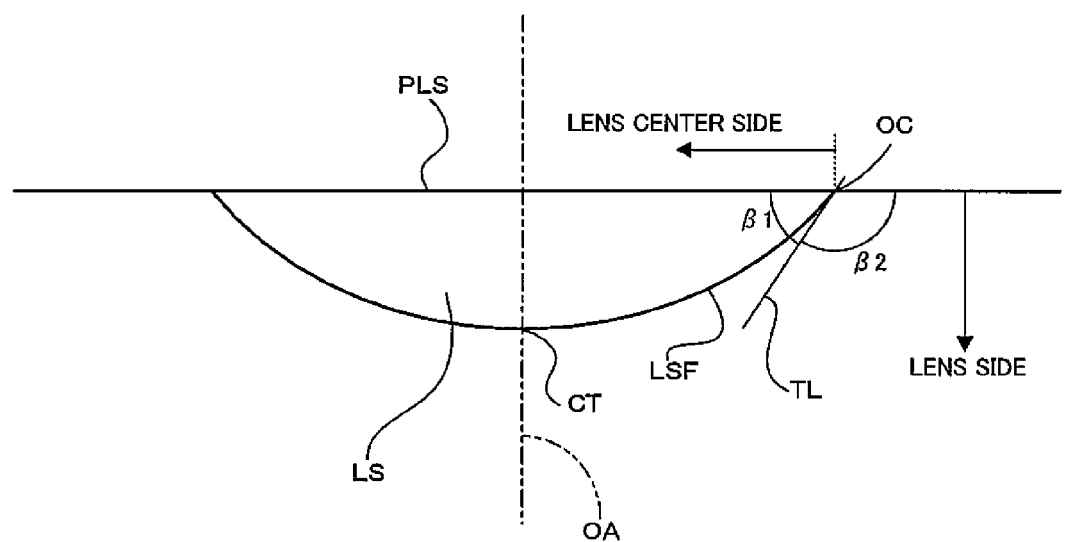
FIG. 20 is a diagram defining the angle of tangent at the lens outer peripheral portion and showing a cross section including the optical axis.

FIG. 20 is diagram for defining the angle of tangent to the lens outer peripheral portion and shows a cross section including the lens center. First of all, it is assumed that TL denotes a tangent to the lens surface LSF at the lens outer peripheral portion OC. Next, out of angles formed by the intersection of the tangent TL and the flat surface PLS, angles formed at a lens side are angles β1, β2. Out of these angles β1, β2, the angle β1 formed at a lens center side is the angle of tangent. At this time, the angle β1 can lie in a range defined by the following formula.

$$0 < \beta1 < 90 \text{ (degrees)}$$

Further, it is assumed that an inclination of the tangent is given by tan (β1).

As shown in FIG. 19, the lens LSa has a lens cross section taken in the longitudinal direction LGD wherein a curvature of the lens Lsa at the lens center CT and a curvature of an outer peripheral portion OCa of the lens LSa are both defined as Cva=1/Ra. On the other hand, the lens LSb has a lens cross section taken in the longitudinal direction LGD wherein a curvature CVb=1/Rb of the lens outer peripheral portion OCb of the lens LSb has a smaller absolute value than the curvature Cva=1/Ra of the lens LSa at the lens center CT. Further, the lens LSc has a lens cross section taken in the longitudinal direction LGD wherein a curvature CVc=−1/Rc of the lens outer peripheral portion Occ of the lens LSc has the opposite sign to the curvature CVa=1/Ra of the lens LSa at the lens center CT. Since the lenses LSb, LSc are configured in this manner, the angles of tangent to the lens outer peripheries OCb, OCc as seen in the lens cross sections taken in the longitudinal direction LGD can be made smaller than the angle of tangent to the lens outer peripheral portion OCa of the lens LSa. That is, with respect to the longitudinal direction LGD in which the lens area LA provided on the glass substrate 2991 exhibits the comparatively great quantity of shrinkage associated with temperature change, the lens outer peripheral portion OC is configured to be more releasable from the mold. As a result, the lens array formed by arranging such lenses LSb, LSc achieves good mold releasability.

In the above embodiment, organic EL devices are used as the light emitting elements 2951 and these organic EL devices have smaller light quantities as compared with LEDs (light emitting diodes) and the like, wherefore the light quantities introduced to the lenses LS tend to decrease. Particularly, in the case of using bottom emission-type organic EL devices, light beams emitted from the organic EL devices are partly absorbed by the head substrate 293. Thus, the light quantities introduced to the lenses LS are further decreased. In such a case, it is thought to increase the lens diameter to introduce sufficient lights to the lenses LS. However, conventionally, there has been a possibility of deteriorating the mold releasability by increasing the lens diameter. On the other hand, since the respective lenses LSb, LSc are so shaped as to be easily released from the mold in the above embodiment, the lens diameter can be easily increased without deteriorating the mold releasability. Therefore, a good exposure can be performed by introducing sufficient light beams to the lenses LS.

Figure 21:
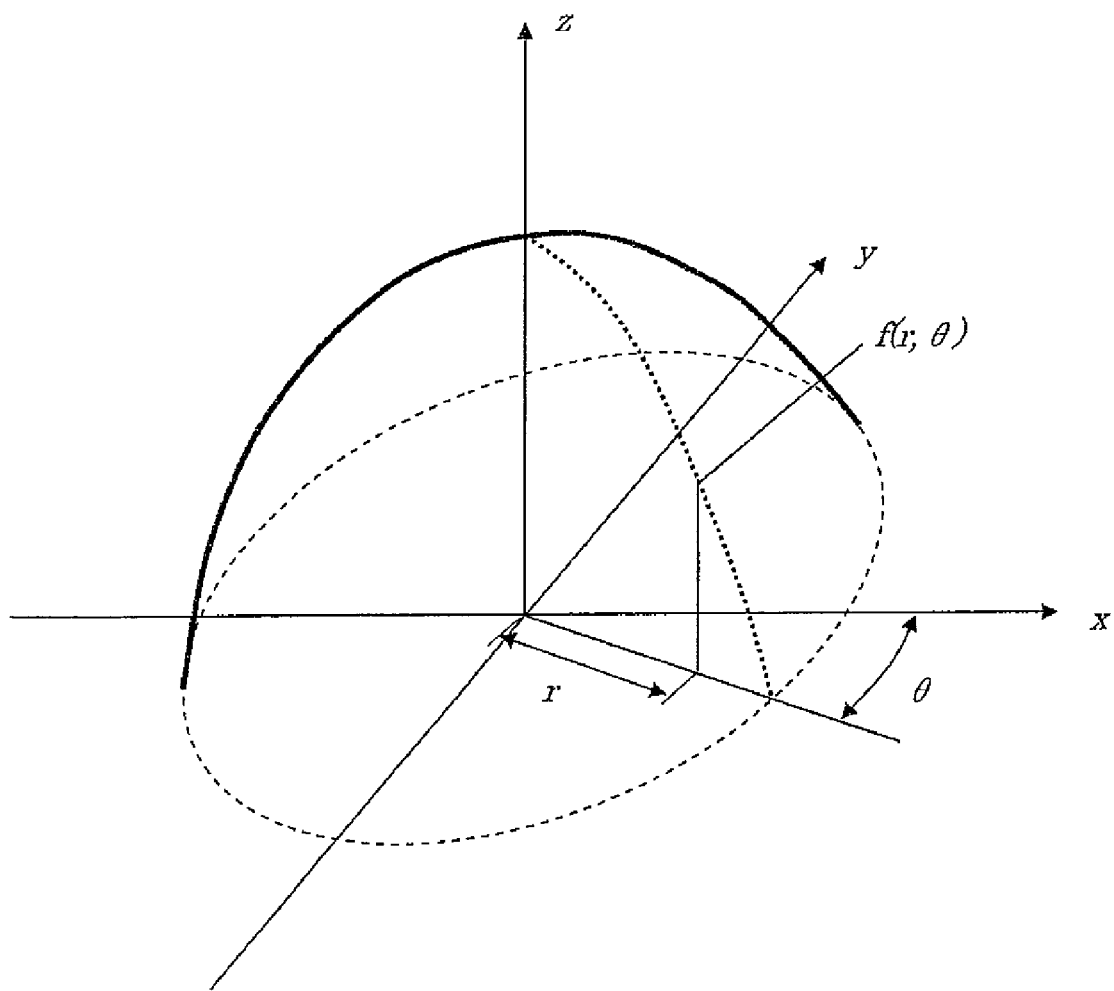
FIG. 21 is a diagram defining the lens surface in an r-θ coordinate system.

Here, the lens surfaces of the lenses LSb, LSc having the curvatures as described above are considered. Upon specifying the lens surfaces, it is effective to use a polar coordinate system, for example, as shown in FIG. 21. In other words, lens height z in an optical axis direction in an r-θ coordinate system is defined as follows based on a distance r from the optical axis OA and an angle of rotation θ about the optical axis OA.

$$z = f(r, \theta)$$

In this case, a curvature (r, θ) at coordinates (r, θ) on the lens surface is expressed by the following formula.

$$c(r, \theta) = \frac{\frac{d^2 f(r, \theta)}{dr^2}}{\left(1 + \left(\frac{d f(r, \theta)}{dr}\right)^2\right)^{\frac{3}{2}}} \quad \text{(Formula 7)}$$

Since r=0 on the optical axis, a curvature on the optical axis OA at a certain angle θ1 is expressed by the following formula.

$$c(0, \theta_1) = \frac{\frac{d^2 f(0, \theta_1)}{dr^2}}{\left(1 + \left(\frac{d f(0, \theta_1)}{dr}\right)^2\right)^{\frac{3}{2}}} \quad \text{(Formula 8)}$$

The curvature of the peripheral portion in the cross section is expressed by a formula 9 when r≠0.

$$c(r, \theta_1) = \frac{\frac{d^2 f(r, \theta_1)}{dr^2}}{\left(1 + \left(\frac{d f(r, \theta_1)}{dr}\right)^2\right)^{\frac{3}{2}}} \quad \text{(Formula 9)}$$

Accordingly, a condition that the curvature of the outer peripheral portion of the lens surface has a sign opposite to the curvature of the lens at the optical axis in the cross section passing the certain optical axis OA is expressed by a formula 10 when r≠0.

$$\frac{\frac{d^2 f(0, \theta)}{dr^2}}{\left(1 + \left(\frac{d f(0, \theta)}{dr}\right)^2\right)^{\frac{3}{2}}} \cdot \frac{\frac{d^2 f(r, \theta)}{dr^2}}{\left(1 + \left(\frac{d f(r, \theta)}{dr}\right)^2\right)^{\frac{3}{2}}} < 0 \quad \text{(Formula 10)}$$

A condition that the curvature of the outer peripheral portion of the lens has a smaller absolute value than the curvature of the lens at the optical axis OA is expressed by a formula 11.

$$\left| \frac{\frac{d^2 f(0, \theta)}{dr^2}}{\left(1 + \left(\frac{d f(0, \theta)}{dr}\right)^2\right)^{\frac{3}{2}}} \right| > \left| \frac{\frac{d^2 f(r, \theta)}{dr^2}}{\left(1 + \left(\frac{d f(r, \theta)}{dr}\right)^2\right)^{\frac{3}{2}}} \right| \quad \text{(Formula 11)}$$

F. Miscellaneous

As described above, in the above embodiment, the longitudinal direction LGD and the main scanning direction MD correspond to a "first direction" of the invention, the width direction LTD and the sub scanning direction SD to a "second direction" of the invention and the photosensitive drum 21 to a "latent image carrier" of the invention.

The invention is not limited to the above embodiments and various changes other than the above can be made without departing from the gist thereof. For example, in the above embodiment, the optical system is constructed using the lens arrays 299 having the lenses LS formed on the back side 2991-t of the glass substrate 2991. However, the construction of the optical system is not limited to this.

Figure 22:
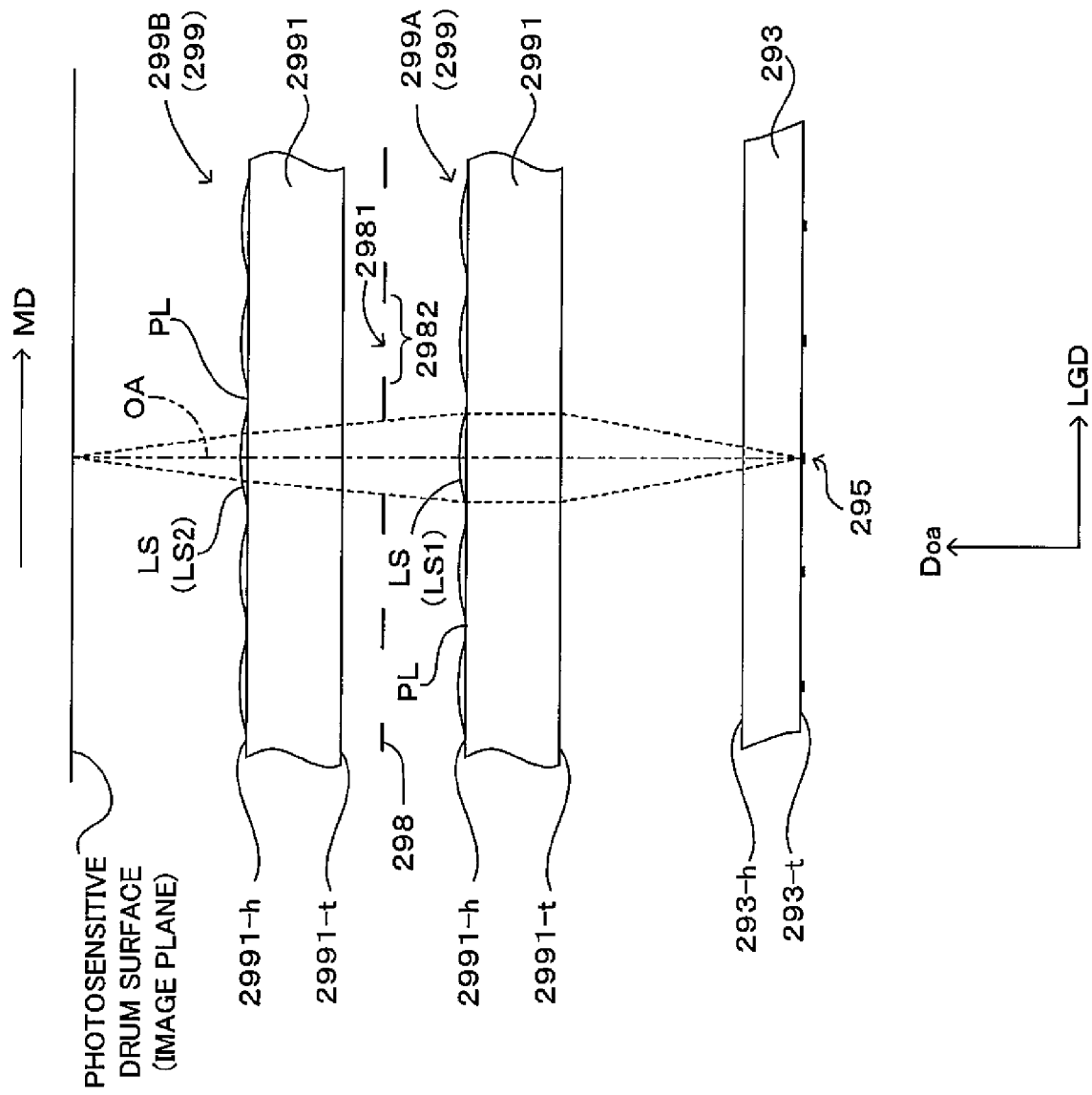
FIG. 22 is a longitudinal sectional view of an optical system according to another embodiment showing a longitudinal cross section including an optical axis of lenses formed on lens arrays.

FIG. 22 is a sectional view of another optical system taken in the longitudinal direction thereof. That is, FIG. 22 shows a cross section taken in the longitudinal direction and including the optical axis of the lenses LS formed in the lens array, and includes the optical axis OA of the lenses LS. The following description will be made on the features of the alternative optical system while parts corresponding to those of the above-described optical system are represented by the corresponding reference characters, respectively, the description of which is dispensed with. As shown in FIG. 22, the alternative optical system comprises the glass substrates formed with the lenses LS on the front sides 2991-h thereof. On the front side 2991-h, therefore, there are the area formed with the lens LS so as to have the finite curvature and the flat end portion PL formed with no lens LS so as to have the infinite curvature.

In the optical system shown in FIG. 22, two lens arrays 299 (299A, 299B) having such a construction are arranged side by side in the light beam propagation direction Doa and two lenses LS1, LS2 arranged in the light propagation direction Doa are arranged for each light emitting element group 295. Further, the optical axis OA (chain double-dashed line in FIG. 22) passing the lens centers of the first and the second lenses LS1, LS2 corresponding to the same light emitting element group 295 is orthogonal to or substantially orthogonal to the under surface 293-t of the head substrate 293. The aperture plate is interposed between the lens array 299A and the lens array 299B in the light beam propagation direction Doa. The aperture plate 298 is formed with the aperture openings 2981 (diaphragms 2982) in correspondence to the respective light emitting element groups 295. The diaphragm 2982 is provided in this manner thereby preventing the unwanted light beam from becoming incident on the lens LS.

In the alternative optical system, the first lens LS1, the diaphragm 2982 and the second lens LS2 are arranged in the light beam propagation direction Doa. Hence, the light beam outputted from the light emitting element group 295 passes through the first lens LS1, is narrowed down by the diaphragm 2982 (aperture plate 298) and then becomes incident on the second lens LS2. Thus, the light beam is imaged.

The alternative optical system is also constituted such that in the lens cross section taken in the longitudinal direction LGD including the optical axis OA of the imaging optical system, the curvature of the outer peripheral portion OC of the lens has the opposite sign to the curvature of the lens at the lens center CT or a smaller absolute value than the curvature of the lens at the lens center CT. Therefore, the lens has the decreased angle of tangent to the outer peripheral portion with respect to the longitudinal direction LGD. The lens outer peripheral portion OC is configured to be more releasable from the mold. In addition, provided that the area of the glass substrate 2991 that is formed with the lenses is defined as the lens area LA, the longitudinal width W11 of the lens area LA as determined in the longitudinal direction and the transverse width W12 thereof as determined in the width direction LTD satisfy the relation (W11>W12). That is, tie lens outer peripheral portion OC is configured to be more releasable from the mold with respect to the longitudinal direction LGD in which the lens area LA exhibits the comparatively great quantity of shrinkage associated with temperature change. As a result, the lens array 299 can achieve the improved mold releasability. In this regard, a detailed description will be made as follows.

Figure 23:
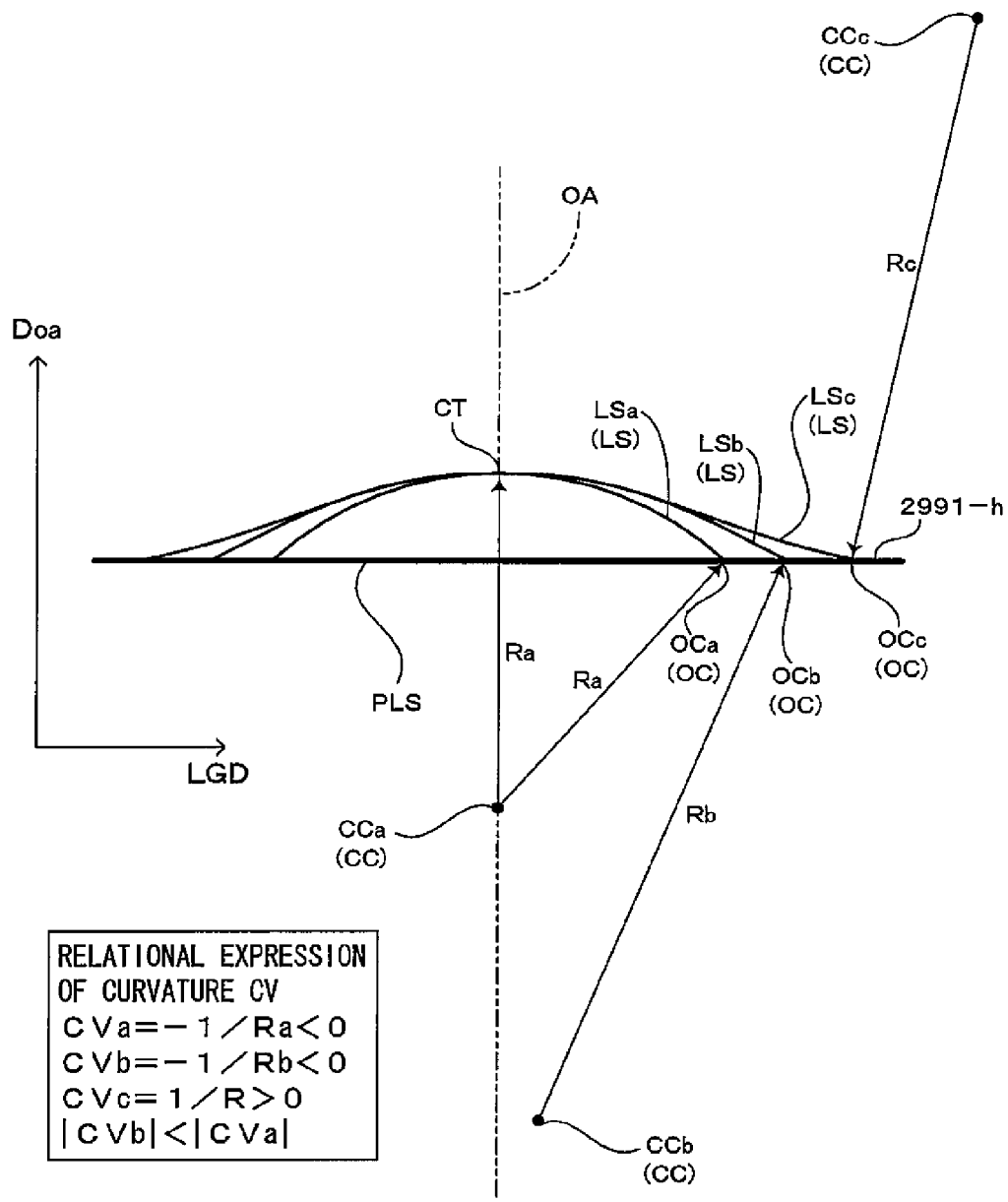
FIG. 23 is a diagram showing the cross sections of the lens including the lens center.

FIG. 23 shows a cross section taken in the longitudinal direction and including the lens center of the lens. The cross section includes the optical axis OA of the lens LS. The lens of FIG. 23 is configured the same way as the lens shown in FIG. 19, except that the lens LS is formed on the surface 2991-t of the glass substrate 2991. Therefore, the following description is made only on difference from the lens of FIG. 19 and the description on the corresponding parts is dispensed with.

Just as in FIG. 19, the lens LSb or the lens LSc shown in FIG. 23 is corresponding to the lens of the invention. The lens LSa is shown for comparison with the lens of the invention. The lens LSa has a lens cross section taken in the longitudinal direction LGD wherein a curvature of the lens LSa at the lens center CT and a curvature of an outer peripheral portion OCa of the lens LSa are both defined as Cva=−1/Ra. On the other hand, the lens LSb has a lens cross section taken in the longitudinal direction LGD wherein a curvature CVb=−1/Rb of an outer peripheral portion OCb of the lens LSb has a smaller absolute value than a curvature Cva=−1/Ra of the lens LSa at the lens center CT. Further, the lens LSc has a lens cross section taken in the longitudinal direction LGD wherein a curvature CVc=1/Rc of an outer peripheral portion OCc of the lens LSc has the opposite sign to a curvature CVa=−1/Ra of the lens LSa at the lens center CT. Since the lenses LSb, LSc are configured in this manner, the angles of tangent to the lens outer peripheries OCb, OCc as seen in the lens cross sections taken in the longitudinal direction LGD can be made smaller than the angle of tangent to the lens outer peripheral portion OCa of the lens LSa. That is, with respect to the longitudinal direction LGD in which the lens area LA provided on the glass substrate 2991 exhibits the comparatively great quantity of shrinkage associated with temperature change, the lens outer peripheral portion OC is configured to be more releasable from the mold. As a result, the lens array formed by arranging such lenses LSb, LSc achieves the good mold releasability.

Although the lenses LS are formed only on either the front side 2991-h or the back side 2991-t of the glass substrate 2991, the lenses LS may be formed on the both sides of the glass substrate 2991.

Further, although the two lens arrays 299 are used in the above embodiments, the number of the lens arrays 299 is not limited to this.

In the above embodiments, three light emitting element group rows 295R are arranged in the width direction LTD. However, the number of the light emitting element group rows 295R is not limited to three and is sufficient to be two or more.

In the above embodiments, each light emitting element group 295 is made up of two light emitting element rows 2951R. However, the number of the light emitting element rows 2951R constituting the light emitting element group 295 is not limited to two and may be, for example, one.

Further, in the above embodiments, the light emitting element row 2951R is made up of four light emitting elements 2951. However, the number of the light emitting elements 2951 constituting the light emitting element row 2951R is not limited to four.

In the above embodiments, organic EL devices are used as the light emitting elements 2951. However, the devices other than the organic EL devices may be used as the light emitting elements 2951. For example, LEDs (light emitting diodes) may be used as the light emitting elements 2951.

Figure 24:
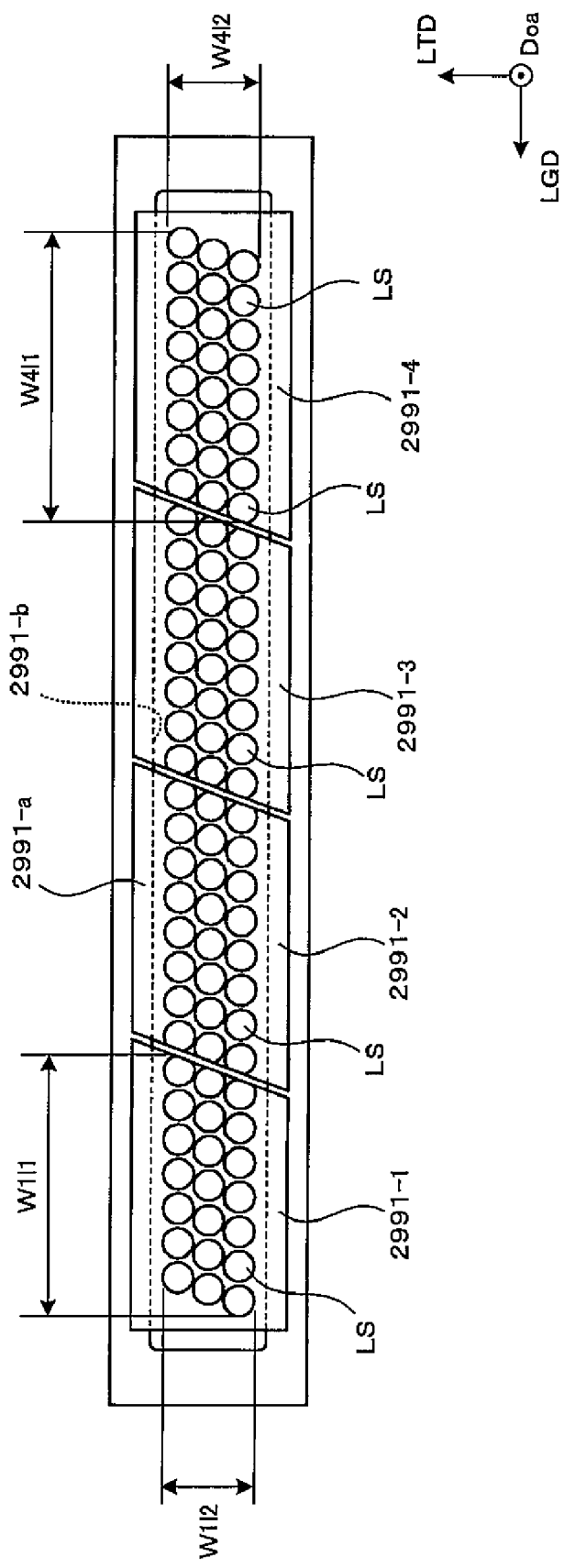
FIG. 24 is a diagram showing a modification lens array.

In the above embodiments, the single lens array 299 is used. However, the number of the lens array is not limited to one. For example, as shown in FIG. 24, four lens arrays 2991-1 to 2991-4 may be disposed in the longitudinal direction LGD. In the embodiment, a lens frame 2991-a has an opening 2991-b at the center portion thereof. The lens arrays 2991-1 to 2991-4 are disposed so as to step over the opening 2991-b and upper portions and lower portions of each lens arrays 2991-1 to 2991-4 contact with upper portion and lower portion of the lens frame 2991-a, respectively. These lens arrays 2991-1 to 2991-4 are provided in the longitudinal direction LGD as straight as a line and are connected to the lens frame 2991-a with adhesives. Each lens array 2991-1 to 2991-4 has a basic construction same as the above embodiment in which the resin lenses LS are provide at the lens area. In order to achieve the good mold releasability, of course, each of lenses comprising the lens array has a constitution wherein a cross section of the lens taken in the longitudinal direction LGD and including an optical axis of the lens has a configuration wherein a curvature of the lens at the optical axis has a larger absolute value than a curvature of an outer peripheral portion of the lens.

Next, examples of the invention are described, but the invention is not restricted by the following examples and can be, of course, embodied by being appropriately changed within the scope conformable to the gist described above and below. Any of these examples are embraced by the technical scope of the invention.

Figure 26:
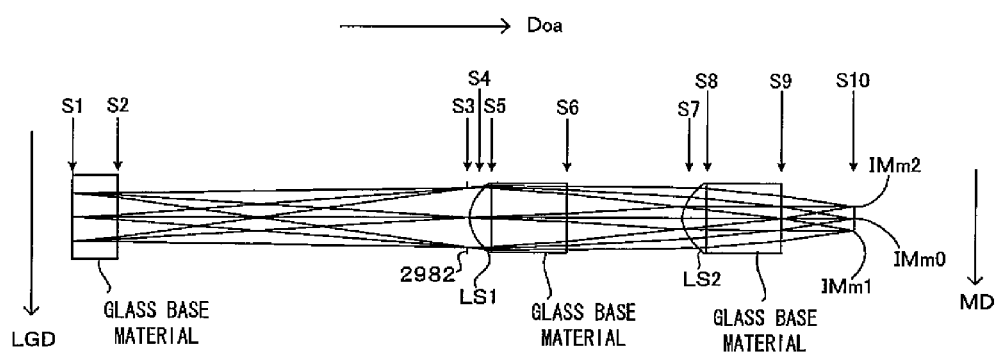
FIG. 26 is a sectional view of the optical system according to Example 1 in a main scanning direction.
Figure 27:
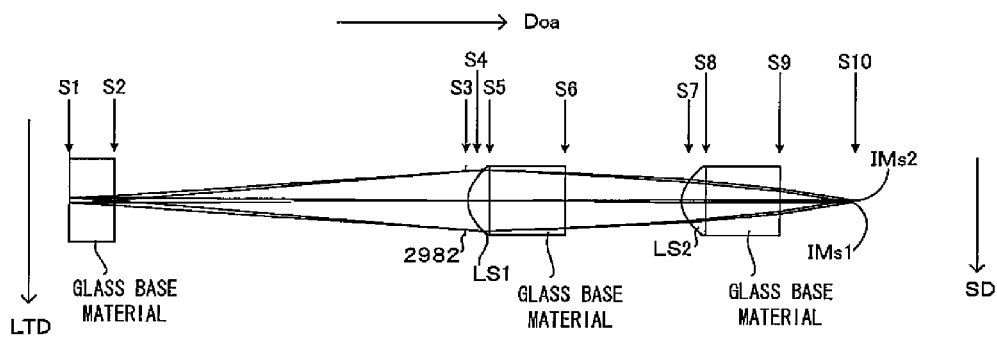
FIG. 27 is a sectional view of the Example 1 in a sub scanning direction.

FIG. 25 is a table showing data on the optical system of the example of the invention. In FIG. 25, the coordinate x in the main scanning direction represents the coordinate axis in the main scanning direction MD, the coordinate y in the sub-scanning direction represents the coordinate axis in the sub-scanning direction SD, and the origin of the x-y coordinate system passes through the optical axis OA. FIG. 26 is a sectional view of the optical system of the example taken in the main scanning direction (the longitudinal direction), while FIG. 27 is a sectional view thereof taken in the sub-scanning direction (the width or transverse direction). Both FIG. 26 and FIG. 27 include the optical axis OA of the lens LS. FIG. 28 shows the conditions used when the optical path shown in FIG. 26 and FIG. 27 is determined by simulation. As shown in FIGS. 26 and 27, an object plane S1 corresponds to the under surface of a glass base material, and Example 2 corresponds to a case where bottom emission-type organic EL devices were used as light emitting elements 2951. First and second lenses LS1, LS2 are both formed on the under surface of the glass base material.

As shown in FIG. 28, the main scanning spot group of the example has a width Wsgm of 0.582 [mm]. FIG. 26 correspondingly shows respective optical paths forming images I Mm0, I Mm1, I Mm2. Specifically, the image I Mm0 is formed on the optical axis (or an image formed at an image height of 0 [mm] in the main scanning direction MD). The image I Mm1 is formed at an image height of 0.291 [mm] (=Wsgm/2) in the main scanning direction MD. The image I Mm2 is formed at an image height of −0.291 [mm](=−Wsgm/2) in the main scanning direction MD. As shown in FIG. 28, the sub scanning spot group of the example has a width Wsgs of 0.058 [mm]. FIG. 27 correspondingly shows respective optical paths forming images I Ms1, I Ms2. Specifically, the image I Ms1 is formed at an image height of 0.029 [mm] (=Wsgs/2) in the sub-scanning direction SD. The image I Ms2 is formed at an image height of −0.029 [mm] (=−Wsgs/2) in the sub-scanning direction SD.

FIG. 29 shows lens data representing the configuration of a lens cross section of the first lens taken in the longitudinal direction thereof (the main scanning direction) including the lens center. FIG. 30 shows lens data representing the configuration of a lens cross section of the first lens taken in the transverse direction thereof (the sub-scanning direction) including the lens center. As shown in FIG. 29, the first lens LS1 has a lens diameter of 1.66 [mm] in the longitudinal direction LGD (=the width Wlpm of the main scan passage area+0.11 [mm]), and has a lens diameter of 1.74 [mm] in the width direction LTD (=the width Wlps of the sub-scan passage area+0.25 [mm]). Namely, the first lens LS1 is configured such that the diameter in the main scanning direction MD differs from the diameter in the sub-scanning direction SD. In this manner, the flexibility in lens design is increased so that favorable lens characteristics can be obtained easily.

FIG. 31 shows lens data representing the configuration of a lens cross section of the second lens taken in the longitudinal direction thereof (the main scanning direction) and including the lens center. FIG. 32 shows lens data representing the configuration of a lens cross section of the second lens taken in the transverse direction thereof (the sub-scanning direction) and including the lens center. As shown in FIG. 31, the first lens LS1 has a lens diameter of 1.66 [mm] in the longitudinal direction LGD (=the width Wlpm of the main scan passage area+0.20 [mm]) and has a lens diameter of 1.65 [mm] in the width direction LTD (=the width Wlps of the sub-scan passage area+0.65 [mm]). Namely, the second lens LS2 is configured such that the diameter in the main scanning direction MD differs from the diameter in the sub-scanning direction SD. In this manner, the flexibility in lens design is increased so that favorable lens characteristics can be obtained easily.

Let us consider a case, for example, where the lens array 299 formed by arranging plural lenses LS (the first lens LS 1 or the second lens LS2) comprises three lens rows LSR. In this case, the transverse diameter of the lens LS in the width direction LTD thereof is on the order of 1.65 to 1.74 [mm] and hence, the width W12 of the lens area LA in the width direction LTD is on the order of 5 [mm]. On the other hand, the width of the line head 29 in the longitudinal direction LGD is normally defined to be greater than the width of the printing area. Therefore, the line head 29 mounted in the image forming apparatus supporting JIS-A3 size sheet is required to have a length on the order of 300 [mm] in the longitudinal direction LGD.

The limitation of lens molding dimensions and the like make it difficult to produce the lens array having the length of 300 mm at the lens area LA thereof Hence, it may be contemplated to increase the length of the lens array by bonding together the plural lens arrays 299 in the longitudinal direction LGD. Even if the length of the lens area is limited to about 50 [mm] in order to ensure the high precision of lens pitch, a ratio of the length in the longitudinal direction LGD of the lens array 299 to the width in the width direction LTD thereof is about 10:1. In consequence, the lens array 299 has a very narrow shape. From the viewpoint of providing good assemblability, the individual lens arrays 299 prior to bonding may desirably have the length in the longitudinal direction LGD increased as much as possible. In such a case, the lens array 299 is further increased in the ratio of the length in the longitudinal direction LGD to the width in the width direction LTD so that the lens array 299 has an even narrower shape. In a case where the lens array 299 is produced using the method wherein the light curing resin is used to form the concave/convex patterns on the glass substrate 2991, it may be sometimes difficult to achieve the good mold releasability because the glass substrate, which has the low linear expansion coefficient, may interfere with the shrinkage of the resin associated with temperature change. Particularly in a case where the above-described ratio is increased to more than 10 times, the variation of mold releasing timing is increased so much that the lenses may sometimes sustain defects.

According to the example, however, the lens LS has the lens cross section taken in the longitudinal direction LGD including the lens center CT of the lens LS wherein a curvature of an outer peripheral portion OC of the lens LS has a smaller absolute value than a curvature of the lens LS at the lens center CT. Thus, the lens has the decreased angle of tangent to the lens outer peripheral portion OC with respect to the longitudinal direction LGD so that the lens outer peripheral portion OC is configured to be more releasable from the mold. Specifically, the first lens LS1 has the lens cross section taken in the longitudinal direction LGD wherein the curvature of the lens outer peripheral portion OC (=0.448) has a smaller absolute value than the curvature of the lens at the lens center CT (=0.674). Thus, the slope (=0.555) of the tangent to the lens outer peripheral portion with respect to the longitudinal direction LGD is limited to the small value. The second lens LS2 has the lens cross section taken in the longitudinal direction LGD wherein the curvature of the lens outer peripheral portion OC (=0.047) has a smaller absolute value than the curvature at the lens center CT (=0.785). Thus, the slope (=0.534) of the tangent to the lens outer peripheral portion with respect to the longitudinal direction LGD is limited to the small value. According to the example, the lens outer peripheral portion OC is configured to be more releasable from the mold in the longitudinal direction LGD in which the lens area LA provided on the glass substrate 2991 exhibits the comparatively great quantity of shrinkage associated with temperature change. As a result, the lens array 299 can achieve the improved mold releasability.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:
1. A line head comprising:
 a light emitting element substrate that has a first light emitting element; and
 a lens array that has a first glass substrate and a first lens, the first glass substrate having a greater width in a first direction than a width in a different direction from the first direction and being disposed apart from the light emitting element substrate, the first lens being formed from a resin and on the first glass substrate so as to image light emitting from the first light emitting element, wherein a cross section of the first lens taken in the first direction and including an optical axis of the first lens has a configuration wherein a curvature of the first lens at the optical axis has a larger absolute value than a curvature of an outer peripheral portion of the first lens, and the first lens has a relation:

$$\left| \frac{\frac{d^2 f(0, \theta)}{dr^2}}{\left(1 + \left(\frac{df(0, \theta)}{dr}\right)^2\right)^{\frac{3}{2}}} \right| > \left| \frac{\frac{d^2 f(r, \theta)}{dr^2}}{\left(1 + \left(\frac{df(r, \theta)}{dr}\right)^2\right)^{\frac{3}{2}}} \right|$$

where r is a distance from the optical axis of the first lens, θ is a rotation angle about the optical axis and f(r, θ) is a lens height in an optical axis direction in an r-θ coordinate system.

2. The line head according to claim 1, wherein the light emitting element substrate has a second light emitting element that is disposed relative to the first light emitting element in the first direction, the lens array has a second lens that is formed from a resin and on the first glass substrate and is disposed relative to the first lens in the first direction so as to image light emitting from the second light emitting element, and a cross section of the second lens taken in the first direction and including an optical axis of the second lens has a configuration wherein a curvature of the second lens at the optical axis has a smaller absolute value than a curvature of an outer peripheral portion of the second lens.

3. The line head according to claim 1, wherein the light emitting element substrate has a third light emitting element that is disposed relative to the first light emitting element in a different direction from the first direction, the lens array has a third lens that is formed from a resin and on the first glass substrate and is disposed relative to the first lens in the different direction so as to image light emitting from the third light emitting element, and a cross section of the third lens taken in the first direction and including an optical axis of the third lens has a configuration wherein a curvature of the third lens at the optical axis has a smaller absolute value than a curvature of an outer peripheral portion of the third lens.

4. The line head according to claim 3, wherein the light emitting element substrate has a fourth light emitting element that is disposed relative to the third light emitting element in the first direction, the lens array has a fourth lens that is formed from a resin and on the first glass substrate and is disposed relative to the third lens in the first direction so as to image light emitting from the fourth light emitting element and a cross section of the fourth lens taken in the first direction and including an optical axis of the fourth lens has a configuration wherein a curvature of the fourth lens at the optical axis has a smaller absolute value than a curvature of an outer peripheral portion of the fourth lens.

5. The line head according to claim 1, wherein the light emitting element substrate has a fifth light emitting element that is disposed relative to the first light emitting element in the first direction, the lens array has a second glass substrate and a fifth lens, the second glass substrate having a greater width in the first direction than a width in the different direction and being connected to the first glass substrate in the first direction, the fifth lens being formed from a resin and on the second glass substrate which is disposed relative to the first glass substrate in the first direction so as to image light emitting from the fifth light emitting element, a cross section of the fifth lens taken in the first direction and including an optical axis of the fifth lens has a configuration wherein a curvature of the fifth lens at the optical axis has a smaller absolute value than a curvature of an outer peripheral portion of the fifth lens.

6. The line head according to claim 1, wherein the cross section of the first lens taken in the first direction and including the optical axis of the first lens has a configuration wherein the curvature of the outer peripheral portion of the first lens and the curvature of the first lens at the optical axis have mutually opposite signs.

7. The line head according to claim 1, wherein the first lens has a diameter of 0.5 or more.

8. The line head according to claim 1, wherein the first lens has a first diameter in the first direction and a second diameter in a different direction from the first direction, and the first diameter and the second diameter are different from each other.

9. The line head according to claim 1, wherein an aperture is interposed between the first light emitting elements and the first lens.

10. The line head according to claim 1, wherein the first lens is formed from a light curing resin.

11. The line head according to claim 1, wherein the first light emitting element is an organic electro-luminescence device.

12. The line head according to claim 1, wherein the organic EL device is of a bottom emission type.

13. An image forming apparatus comprising:

an exposure unit that includes a light emitting element substrate that has a light emitting element and a lens array that has a glass substrate and a lens, the glass substrate having a greater width in a first direction than a width in a different direction from the first direction and being disposed apart from the light emitting element substrate, the first lens being formed from a resin and on the glass substrate so as to image light emitting from the light emitting element;

an image carrier on which a latent image is formed by means of the exposure unit; and a developer that develops the latent image formed on the image carrier, wherein a cross section of the lens taken in the first direction and including an optical axis of the lens has a configuration wherein a curvature of the lens at the optical axis has a smaller larger absolute value than a curvature of an outer peripheral portion of the lens, and the lens has a relation:

$$\left|\frac{\frac{d^2 f(0,\theta)}{dr^2}}{\left(1+\left(\frac{df(0,\theta)}{dr}\right)^2\right)^{\frac{3}{2}}}\right| > \left|\frac{\frac{d^2 f(r,\theta)}{dr^2}}{\left(1+\left(\frac{df(r,\theta)}{dr}\right)^2\right)^{\frac{3}{2}}}\right|$$

where r is a distance from the optical axis of the lens, θ is a rotation angle about the optical axis and f(r, θ) is a lens height in an optical axis direction in an r-θ coordinate system.

14. A lens array comprising:
a first glass substrate that has a greater width in a first direction than a width in a different direction from the first direction; and
a first lens that is formed from a resin and on the first glass substrate, wherein
a cross section of the first lens taken in the first direction and including an optical axis of the first lens has a configuration wherein a curvature of the first lens at the optical axis has a larger absolute value than a curvature of an outer peripheral portion of the first lens, and
the first lens has a relation:

$$\left|\frac{\frac{d^2 f(0,\theta)}{dr^2}}{\left(1+\left(\frac{df(0,\theta)}{dr}\right)^2\right)^{\frac{3}{2}}}\right| > \left|\frac{\frac{d^2 f(r,\theta)}{dr^2}}{\left(1+\left(\frac{df(r,\theta)}{dr}\right)^2\right)^{\frac{3}{2}}}\right|$$

where r is a distance from the optical axis of the first lens, θ is a rotation angle about the optical axis and f(r, θ) is a lens height in an optical axis direction in an r coordinate system.

15. The lens array according to claim 14, further comprising:
a second lens formed from a resin and on the first glass substrate and disposed relative to the first lens in the first direction;
wherein a cross section of the second lens taken in the first direction and including an optical axis of the second lens has a configuration wherein a curvature of the second lens at the optical axis has a smaller absolute value than a curvature of an outer peripheral portion of the second lens.

16. The lens array according to claim 14, further comprising:
a second glass substrate that has a greater width in the first direction than a width in the different direction from the first direction and is connected to the first glass substrate in the first direction; and
a third lens that is formed from a resin and on the second glass substrate,
wherein a cross section of the third lens taken in the first direction and including an optical axis of the third lens has a configuration wherein a curvature of the third lens at the optical axis has a smaller absolute value than a curvature of an outer peripheral portion of the third lens.

* * * * *